US010181121B2

(12) United States Patent
Roberts et al.

(10) Patent No.: US 10,181,121 B2
(45) Date of Patent: *Jan. 15, 2019

(54) APPARATUS, METHOD, AND COMPUTER PROGRAM PRODUCT FOR RECOVERING TORN SMART PAYMENT DEVICE TRANSACTIONS

(71) Applicant: MasterCard International Incorporated, Purchase, NY (US)

(72) Inventors: David A. Roberts, Appleton (GB); Duncan Garrett, London (GB); Eddy L. H. Van de Velde, Leuven (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 568 days.

This patent is subject to a terminal disclaimer.

(21) Appl. No.: 13/754,419

(22) Filed: Jan. 30, 2013

(65) Prior Publication Data
US 2013/0246269 A1 Sep. 19, 2013

Related U.S. Application Data

(63) Continuation of application No. 12/769,245, filed on Apr. 28, 2010, now Pat. No. 8,370,258.
(Continued)

(51) Int. Cl.
*G06Q 30/00* (2012.01)
*G06Q 20/40* (2012.01)
(Continued)

(52) U.S. Cl.
CPC ............ *G06Q 20/40* (2013.01); *G06Q 20/10* (2013.01); *G06Q 20/18* (2013.01); *G06Q 20/38* (2013.01);
(Continued)

(58) Field of Classification Search
CPC ....................................................... G06K 5/00
(Continued)

(56) References Cited

U.S. PATENT DOCUMENTS 6,101,477 A 8/2000 Hohle
6,119,945 A 9/2000 Muller
(Continued)

FOREIGN PATENT DOCUMENTS

WO WO 2002-054195 7/2002
WO WO/2012/037971 3/2012

OTHER PUBLICATIONS

"EMV" downloaded from http://en.wikipedia.org/wiki/EMV on Sep. 22, 2010.
(Continued)

*Primary Examiner* — John H. Holly
(74) *Attorney, Agent, or Firm* — Otterstedt, Ellenbogen & Kammer, LLP

(57) ABSTRACT

A first command is sent from a payment terminal assembly to a payment device with an on-device balance to compute a cryptogram to complete a putative transaction. It is detected that the cryptogram is not received as expected. In response, an identifier of the payment device and transaction recovery data associated with the putative transaction are stored in a storage area of a terminal memory of the payment terminal assembly. The payment terminal assembly obtains the identifier of the payment device, upon re-presentation of the payment device. Upon such re-presentation, the payment terminal assembly compares the obtained identifier of the payment device to contents of the storage area. Conditioned at least upon the comparing yielding a match, a second command is sent from the payment terminal assembly to the payment device to instruct the payment device to re-produce the cryptogram to complete the putative transaction.

16 Claims, 8 Drawing Sheets

Related U.S. Application Data

(60) Provisional application No. 61/173,471, filed on Apr. 28, 2009.

(51) Int. Cl.
*G06Q 20/10* (2012.01)
*G06Q 20/18* (2012.01)
*G06Q 20/38* (2012.01)
*G07F 7/10* (2006.01)
*G07F 7/12* (2006.01)

(52) U.S. Cl.
CPC ......... *G06Q 20/382* (2013.01); *G07F 7/1008* (2013.01); *G07F 7/12* (2013.01)

(58) Field of Classification Search
USPC ..... 705/44, 1.1, 71, 40, 41, 67, 21; 380/258, 380/277; 235/492, 375
See application file for complete search history.

(56) References Cited

U.S. PATENT DOCUMENTS

| | | | |
|---|---|---|---|
| 6,375,084 B1 | 4/2002 | Stanford | |
| 6,398,110 B1 | 6/2002 | Kikuchi | |
| 6,402,038 B1 | 6/2002 | Stanford | |
| 7,080,259 B1* | 7/2006 | Nakanishi | G06Q 20/363 380/277 |
| 7,287,695 B2 | 10/2007 | Wankmueller | |
| 7,657,486 B2 | 2/2010 | Smets | |
| 8,201,747 B2* | 6/2012 | Brown | G07F 7/0806 235/382.5 |
| 2001/0018660 A1 | 8/2001 | Sehr | |
| 2001/0027441 A1 | 10/2001 | Wankmueller | |
| 2002/0004783 A1* | 1/2002 | Paltenghe | G06F 21/6209 705/41 |
| 2002/0147907 A1 | 10/2002 | Ross | |
| 2003/0097344 A1 | 5/2003 | Chaum | |
| 2003/0236748 A1 | 12/2003 | Gressel | |
| 2004/0230535 A1 | 11/2004 | Binder | |
| 2004/0238624 A1 | 12/2004 | Nakano | |
| 2005/0033688 A1 | 2/2005 | Peart | |
| 2006/0049258 A1 | 3/2006 | Piikivi | |
| 2007/0012763 A1 | 1/2007 | Van de Velde | |
| 2007/0168260 A1 | 7/2007 | Cunescu | |
| 2007/0215697 A1* | 9/2007 | Ward | G06Q 20/10 235/380 |
| 2008/0082452 A1 | 4/2008 | Wankmueller | |
| 2008/0126398 A1 | 5/2008 | Cimino | |
| 2008/0179403 A1 | 7/2008 | Englebardt | |
| 2008/0251580 A1 | 10/2008 | Van de Velde | |
| 2008/0301056 A1 | 12/2008 | Weller | |
| 2009/0103730 A1 | 4/2009 | Ward | |
| 2010/0274712 A1 | 10/2010 | Mestré | |
| 2010/0325039 A1 | 12/2010 | Radu | |
| 2012/0011062 A1 | 1/2012 | Baker | |
| 2012/0011070 A1 | 1/2012 | Ward | |

OTHER PUBLICATIONS

"ISO 8583" downloaded from http://en.wikipedia.org/wiki/ISO_8583 on Sep. 22, 2010.

"Mobile payment" downloaded from http://en.wikipedia.org/wiki/Mobile_payment#Online_Wallets on Sep. 22, 2010.

EMV Integrated Circuit Card Specifications for Payment Systems Book 1 Application Independent ICC to Terminal Interface Requirements Version 4.2 Jun. 2008.

EMV Integrated Circuit Card Specifications for Payment Systems Book 2 Security and Key Management Version 4.2 Jun. 2008.

EMV Integrated Circuit Card Specifications for Payment Systems Book 3 Application Specification Version 4.2 Jun. 2008.

EMV Integrated Circuit Card Specifications for Payment Systems Book 4 Cardholder, Attendant, and Acquirer Interface Requirements Version 4.2 Jun. 2008.

EMV Integrated Circuit Card Specifications for Payment Systems—Common Payment Application Specification, Version 1.0, Dec. 2005, pp. i-xx & L-33 to L-34.

Corrections to Common Core Definitions, Specification Update Bulletin No. 41, 3rd Edition Nov. 2007, EMVCo.

Support for Transaction Log Files, Specification Update Bulletin No. 19 Second Edition, May 2004, EMVCo.

ISO/IEC9797-1 Information technology—Security techniques—Message Authentication Codes (MACs)—Part 1, downloaded from http://en.wikipedia.org/wiki/ISO/IEC_9797-1 on Mar. 22, 2012.

"Message authentication code" downloaded from http://en.wikipedia.org/wiki/Message_authentication_code on Sep. 17, 2010.

"Chipo Terms Explained: A Guide to Smart Card Terminology." downloaded from http://www.visa-asia.com/ap/center/merchants/productstech/includes/uploads/CTENov02.pdf on Sep. 17, 2010.

Bank Zachodni WBK "Top-Up Card" downloaded from http://english.bzwbk.pl/28600 on Sep. 22, 2010.

Bank Zachodni WBK "Premium Top-Up Card" downloaded from http://english.bzwbk.pl/34595 on Sep. 22, 2010.

Bank Zachodni WBK "Pre-Paid Cards" downloaded from http://english.bzwbk.pl/38134 on Sep. 22, 2010.

"Near Field Communication." downloaded from http://en.wikipedia.org/wiki/Near_Field_Communication on Sep. 22, 2010.

* cited by examiner

APPARATUS, METHOD, AND COMPUTER PROGRAM PRODUCT FOR RECOVERING TORN SMART PAYMENT DEVICE TRANSACTIONS

CROSS-REFERENCE TO RELATED APPLICATIONS

This patent application is a continuation of U.S. patent application Ser. No. 12/769,245, filed Apr. 28, 2010, entitled "APPARATUS, METHOD, AND COMPUTER PROGRAM PRODUCT FOR RECOVERING TORN SMART PAYMENT DEVICE TRANSACTIONS," of Inventors David A. Roberts, Duncan Garrett, and Eddy L. H. Van de Velde, which in turn claims the benefit of U.S. Provisional Patent Application Ser. No. 61/173,471 filed on Apr. 28, 2009 and entitled "M/Chip 4 Release 2 (Payment Card Application) (A&B)." The complete disclosures of the aforementioned U.S. patent application Ser. No. 12/769,245 and Provisional Patent Application Ser. No. 61/173,471 are expressly incorporated herein by reference in their entireties for all purposes.

FIELD OF THE INVENTION

The present invention relates generally to the electronic and computer arts, and, more particularly, to apparatus and methods for electronic payment.

BACKGROUND OF THE INVENTION

Devices, such as electronic devices, and particularly electronic payment devices (for example, so-called "smart cards") may be useful for a variety of payment and other applications. Some payment products, such as those referred to as pre-authorized or offline-prepaid, rely on a balance managed by the card. The balance indicates the funds available on the card and is decreased by the transaction amount when a transaction takes place. For customer convenience, the terminal may display this balance before and after the card is debited.

In some types of infrastructure, the card is debited using a command issued by the terminal. The command data typically contains the transaction amount, while the corresponding response from the card confirms (and authenticates) that the card was debited and provides the necessary information for the clearing of the transaction.

United States Patent Publication 2004-0230535 of Binder et al. discloses a method and system for conducting off-line and on-line pre-authorized payment transactions. In the Binder et al. invention, a system and method are provided for conducting a financial transaction using an integrated circuit device issued by a card issuer and capable of conducting off-line and on-line transactions with a payment card network. The method includes utilizing the card for conducting a transaction and reading from the card a pre-authorized balance, a pre-authorized limit, and an account number. The method also includes requesting on-line authorization in the event the value of the transaction is greater than the difference between the pre-authorized limit and the pre-authorized balance. Finally, the method includes receiving authorization to conduct the transaction and updating by the card the pre-authorized balance and the pre-authorized limit, wherein the card issuer, through the integrated circuit device, is able to continually update the pre-authorized limit based on various factors including the transaction and account activity. The complete disclosure of the aforementioned United States Patent Publication 2004-0230535 of Binder et al. is expressly incorporated herein by reference in its entirety for all purposes.

SUMMARY OF THE INVENTION

Principles of the invention provide techniques for recovering torn smart payment device transactions. In one aspect, an exemplary method includes the step of facilitating initial presentation of a payment device to a payment terminal assembly in connection with a putative transaction, the payment device comprising a payment device memory storing a device-side payment application, with an on-device balance, and at least one payment device processor coupled to the payment device memory. The payment terminal assembly comprises a terminal memory, storing a terminal-side payment application, and at least one terminal processor coupled to the terminal memory. Additional steps include sending a first command from the payment terminal assembly to the payment device to compute a cryptogram to complete the putative transaction; detecting that the cryptogram is not received as expected; and, responsive to the detection, storing in a storage area of the terminal memory an identifier of the payment device and transaction recovery data associated with the putative transaction. Further steps include obtaining, by the payment terminal assembly, the identifier of the payment device, upon re-presentation of the payment device to the payment terminal assembly; and, upon the re-presentation of the payment device to the payment terminal assembly, comparing, by the payment terminal assembly, of the obtained identifier of the payment device to contents of the storage area. A still further step includes, conditioned at least upon the comparing yielding a match, sending a second command from the payment terminal assembly to the payment device, the second command instructing the payment device to re-produce the cryptogram to complete the putative transaction.

In another aspect, a payment terminal assembly includes a terminal memory, storing a terminal-side payment application; and at least one terminal processor coupled to the terminal memory. The at least one terminal processor is operative to: detect initial presentation of a payment device in connection with a putative transaction; send a first command to the payment device to compute a cryptogram to complete the putative transaction; and detect that the cryptogram is not received as expected. The at least one terminal processor is further operative to, responsive to the detection, store in a storage area of the terminal memory an identifier of the payment device and transaction recovery data associated with the putative transaction; obtain the identifier of the payment device, upon re-presentation of the payment device to the payment terminal assembly; upon the re-presentation of the payment device to the payment terminal assembly, compare the obtained identifier of the payment device to contents of the storage area; and, conditioned at least upon the comparing yielding a match, send a second command to the payment device, the second command instructing the payment device to re-produce the cryptogram to complete the putative transaction.

In still another aspect, an exemplary payment device includes a payment device memory storing a device-side payment application, with an on-device balance; and at least one payment device processor coupled to the payment device memory. The at least one payment device processor is operative to: receive a first command from a payment terminal assembly to compute a cryptogram to complete a putative transaction; and receive a second command from the payment terminal assembly, upon re-presentation of the payment device to the payment terminal assembly. The second command instructs the payment device to re-produce the cryptogram to complete the putative transaction. The at least one payment device processor is further operative to respond to the second command with the re-produced cryptogram.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention can provide substantial beneficial technical effects; for example:
  Avoiding multiple decrementing of the offline balance of the card leading to apparent loss of funds by the cardholder thereby causing cardholder dissatisfaction
  Avoiding erroneous depletion of offline balance on the card so that a transaction, repeated, cannot complete successfully leading to cardholder and merchant dissatisfaction
  Facilitating offline-only acceptance environments, without the cost of providing online communication to the issuer, whilst still maintaining cardholder satisfaction
  Removing or significantly reducing the need for reconciliation and refund of torn transactions by the issuer
  Maintaining a high level of transaction security and reducing the opportunities for fraud that may arise through manual procedures invoked to recover from torn transactions
  Providing a technique for a contactless reader to recover a transaction that is torn in a manner that has no impact, involvement or change needed to a connected terminal.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
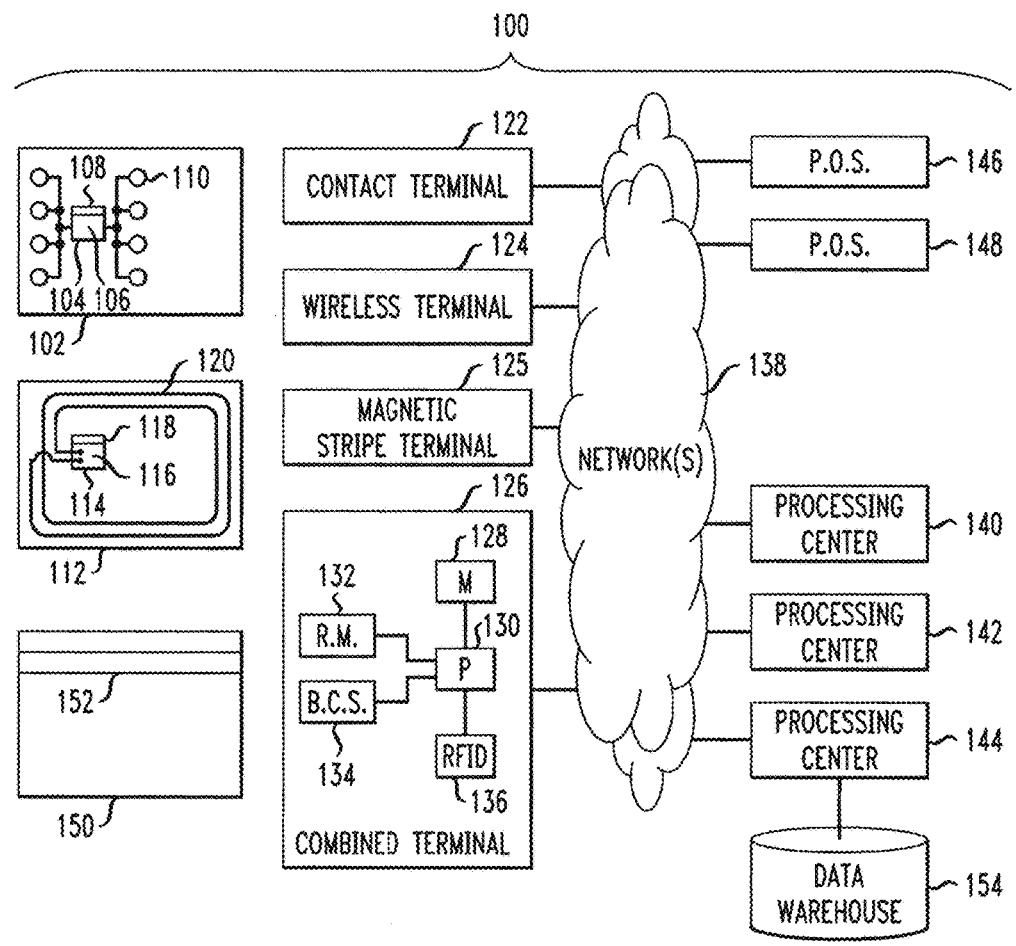
FIG. 1 shows an example of a system and various components thereof that can implement techniques of the invention.
Figure 1:
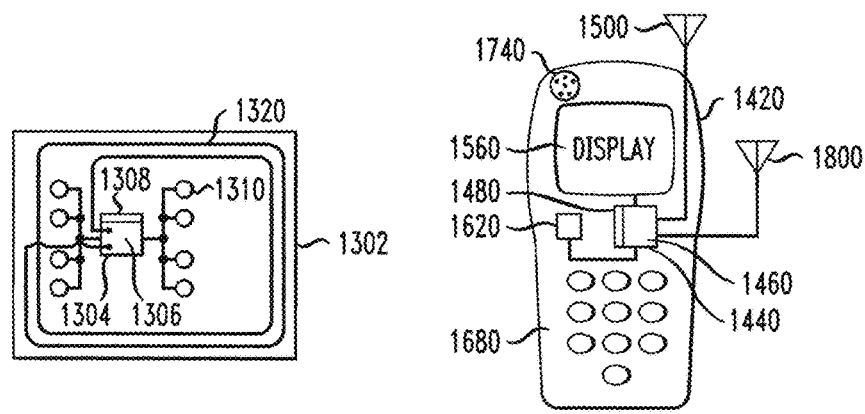

Attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory (e.g., one or more EEPROMs as discussed below). The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by MAOSCO Limited (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

It should be noted that the skilled artisan will be familiar with the EMV specifications. Nevertheless, out of an abundance of caution, the following documents are expressly incorporated herein by reference in their entirety for all purposes (the same are published by EMVCo and available on EMVCo's web site):

EMV Integrated Circuit Card Specifications for Payment Systems Book 1 Application Independent ICC to Terminal Interface Requirements Version 4.2 Jun. 2008

EMV Integrated Circuit Card Specifications for Payment Systems Book 2 Security and Key Management Version 4.2 Jun. 2008

EMV Integrated Circuit Card Specifications for Payment Systems Book 3 Application Specification Version 4.2 Jun. 2008

EMV Integrated Circuit Card Specifications for Payment Systems Book 4 Cardholder, Attendant, and Acquirer Interface Requirements Version 4.2 Jun. 2008

*EMV Integrated Circuit Card Specifications for Payment Systems—Common Payment Application Specification*, Version 1.0, December 2005

*Corrections to Common Core Definitions*, Specification Update Bulletin No. 41, First Edition June 2005, EMVCo

*Support for Transaction Log Files*, Specification Update Bulletin N°19 Second Edition, May 2004, EMVCo.

As noted, cards 102, 112 are examples of a variety of payment devices that can be employed. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. In some cases, the cards, or other payment devices, can include body portions (e.g., laminated plastic layers of a payment card, case or cabinet of a PDA or cellular phone, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

In one or more versions of the infrastructure, a dual-interface device 1302 is employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112.

An appropriately configured cellular telephone handset 1420 can also be employed in infrastructure 100. Handset 1420 is depicted in semi-schematic form in FIG. 1, and can include one or more IC chips such as chip 1440 including a processing unit 1460 and a memory unit 1480. Wireless communication with a terminal can be provided via antenna 1500 or with a second antenna 1800 similar to above-described antenna 120 (i.e., the handset could have a second antenna for the payment application). Note that antenna 1800 is depicted schematically, but could be, e.g., a coil antenna as used in a typical "smart" card. Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 1680 and speaker 1740 can be provided.

The description of devices, elements, or components 102, 104, 106, 108, 110, 112, 114, 116, 118, 120 throughout this document are equally applicable to the corresponding items in the dual interface card 1302 and cellular telephone handset 1420.

Figure 2:
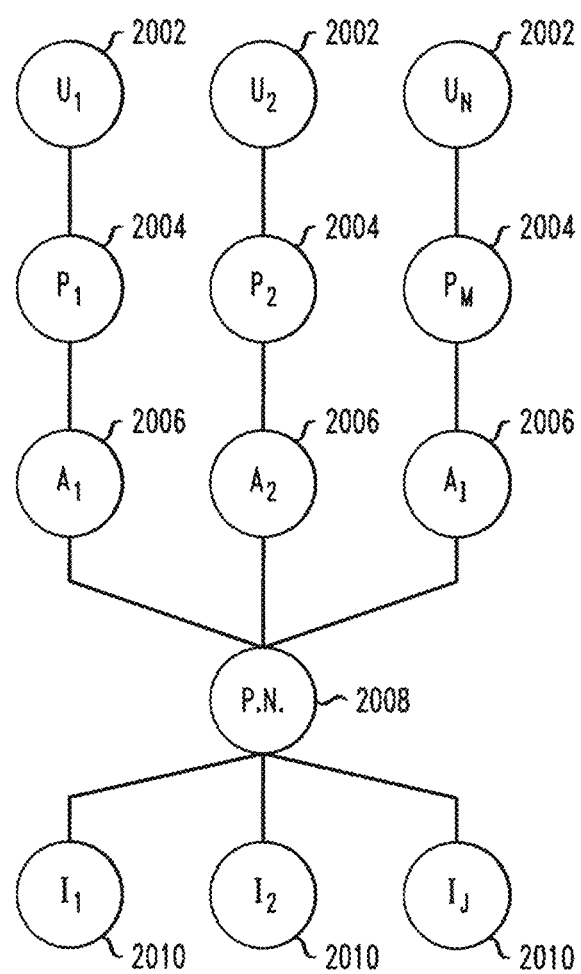
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers) 2002, $U_1$, $U_2$ . . . $U_N$, interact with a number of different merchants 2004, $P_1$, $P_2$ . . . $P_M$. Merchants 2004 interact with a number of different acquirers 2006, $A_1$, $A_2$ . . . $A_I$. Acquirers 2006 interact with a number of different issuers 2010, $I_1$, $I_2$ . . . $I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed with other kinds of payment networks, for example, proprietary or closed payments networks with only a single issuer and acquirer, such as the AMERICAN EXPRESS network (mark of American Express Company) (it being appreciated that the latter is a non-limiting example of a proprietary or closed payment network).

Some embodiments may be employed with payment systems such as EMV where some transactions may be authorized offline without the authorization request and response exchange with the issuer and these offline authorized transactions are also stored in "batches" which are later sent for clearing and settlement.

Messages within a network such as network 138 and/or network 2008, may, in at least some instances, conform to the International Organization for Standardization (ISO) Standard 8583, *Financial transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

Furthermore, although the skilled artisan will be familiar with same, out of an abundance of caution, the following document is expressly incorporated herein by reference in its entirety for all purposes (published by ISO, Geneva, Switzerland, and available on the ISO web site): ISO/IEC 9797-1 Information technology—Security techniques—Message Authentication Codes—Part 1: Mechanisms using a block cipher As noted, some payment products, such those known as "pre-authorized" or "offline-prepaid," rely on a balance managed by the card. The balance indicates the funds available on the card and is decreased by the transaction amount as a result of the transaction. For customer convenience, the terminal may display this balance before and after the card is debited.

In certain types of infrastructure, such as an EMV infrastructure, the card is debited using a command such as the GENERATE AC command (known to the skilled artisan from the EMV specifications). The command data of such a command, such as the GENERATE AC command, contains the transaction amount, while the response from the card confirms (and authenticates) that the card was debited and provides the necessary information for the clearing of the transaction.

"Tearing" refers to a card which is removed from the field (for contactless transactions) or from the chip card reader (for contact transactions) before a transaction is completed. With contactless payment, there is an increased risk for "torn" transactions, i.e., the cardholder may retrieve his or her payment card before the full data exchange between terminal and card has been completed. In particular, there is a risk that the command, such as the GENERATE AC command, may be received and processed by the card—so that the card balance is debited—but that the card is removed before the response to the GENERATE AC command is received by the terminal. There may only be a small time window for error but the impact of this error is significant as the cardholder has been debited but the merchant has not received the data they require for settlement and therefore will not provide the goods and/or services.

One or more embodiments provide a suitable mechanism to correct this error. In one or more embodiments, a mechanism is provided in the card so that the terminal can:

Detect that transaction recovery is supported by card (by the presence of an additional data element, such as a data recovery data object list or DRDOL)

Detect that a particular transaction was torn, i.e., that the card has been debited but that the outcome of the transaction was not received by the terminal Recover the card data so that the torn transaction can be cleared after all.

In one or more instances, the mechanism employs storage of data on the card. For each transaction, the card application will store the necessary data, anticipating that a tear may happen. Together with the balance update, the data for tear recovery is committed to non-volatile memory as part of the same atomic update. The update is "Atomic" in that the update of the tear recovery data and the update of the balance or related counters either all take place or do not take place at all so that a partial update where one part is updated but another part is not cannot occur. Thus, if the balance is updated, the recovery data is available and the transaction can be recovered. If the balance is not updated, there is no need for recovery and the recovery data are not stored. The concept of an "atomic" update per se is known to the skilled artisan; such skilled artisan, given the teachings herein, will be able to implement atomic updating in the context of one or more embodiments of the invention.

In one or more embodiments, the necessary data include enough information for the terminal to create a clearing record and to authenticate the data coming from the card. Therefore, the recovery data have the same quality as the data from a transaction that completes successfully (i.e. is not torn).

One or more embodiments advantageously allow recovery of a torn transaction, which is a significant factor for the success of an offline pre-authorized or prepaid product. Unlike certain current mechanisms, one or more embodiments employ storage on the card, rather than relying on the terminal increasing the card's balance to undo the transaction. This latter, current approach may introduce a security risk, depending on the level of security implemented in the terminal and the algorithm used. One example of a prior technique is disclosed in US Patent Publication No. 2007-0215697, the complete disclosure of which is expressly incorporated herein in its entirety for all purposes.

One or more embodiments thus provide a mechanism designed to address an issue that largely exists in the context of a contactless transaction (but potentially can exist in a contacted transaction as well, although it tends to happen more frequently in the contactless transaction context). This aspect is particularly applicable where the card being used is in some way a prepaid account card having an offline balance with a specific amount of funds available, known to the card, and used by the card to determine whether or not it is possible to spend. These types of payment products are becoming quite common.

Figure 3:
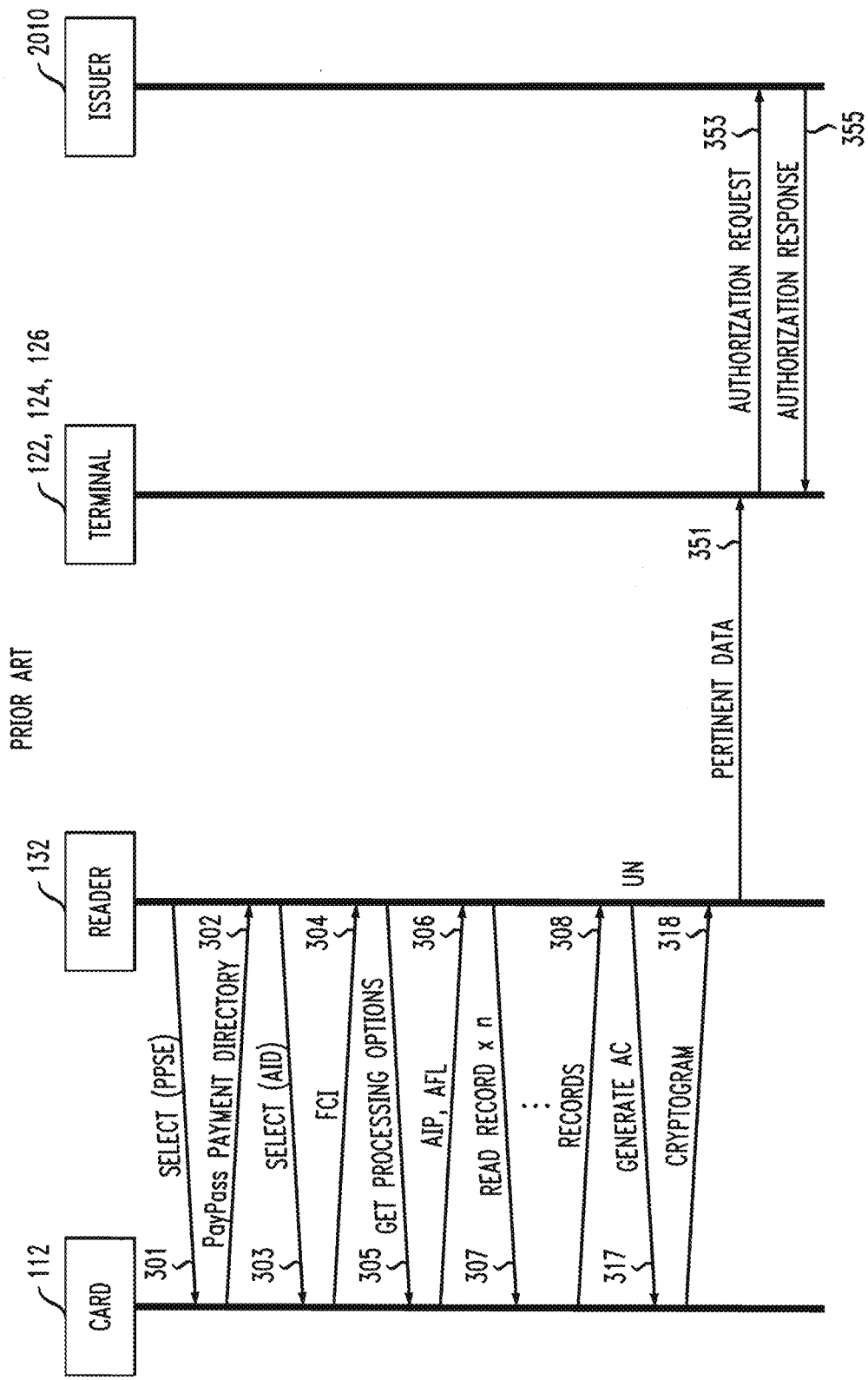
FIG. 3 is a message flow diagram depicting prior art techniques.

Reference should now be had to FIG. 3, which depicts a standard EMV transaction flow. The complete disclosure of US Patent Publication No. 2009-0103730 is expressly incorporated herein in its entirety for all purposes. In a normal transaction, in a zeroth step (not illustrated), the reader 132 and card 112 (understood to include other kinds of devices, as well—throughout this specification, descriptions of smart "cards" are equally applicable to other smart payment devices, unless indicated otherwise), establish communications. Note that the reader may be a peripheral device of the terminal (e.g., 122, 124, 126), which performs the interaction with the card. It should be noted that in some instances, the terminal and reader are integrated into a single point-of-sale (POS) device while in others, they may be separate. Furthermore, in some instances, the terminology "terminal" is used as shorthand for the reader and terminal together; the skilled artisan will appreciate this from the context. In some instances, the functionality can be incorporated into the reader rather than requiring changes to the terminal.

In a first step 301, the SELECT (PPSE) command allows the reader 132 to find out what payment applications the card has. This information is returned in the PAYPASS PAYMENT DIRECTORY in step 302. In step 303, the reader selects an appropriate one of the applications using the SELECT command with the appropriate application identifier (AID) as an argument. Step 304 includes the return of FCI—File Control Information from the selected payment application. The FCI data may also specify the PDOL—Processing Data Objects List, which is data that the card needs from the reader in order to conduct the transaction as defined immediately hereinafter for step 305. In step 305, if the card asked for any specific data in step 304, the reader sends it in step 305, via the GET PROCESSING OPTIONS command. This step "says" to the card "tell me the basic context for the transaction. What do I need to read from you and what process shall we use?" The various commands and arguments are familiar to the skilled artisan from the EMV, PAYPASS® M/CHIP® & PAYPASS® MAGSTRIPE standards (registered marks of MasterCard International Incorporated, Purchase, N.Y., USA). Step 306 includes the card responding to the GET PROCESSING OPTIONS command telling the reader the information that it needs for the transaction—AIP (Application Interchange Profile) tells the reader how to conduct the transaction, while AFL (application file locator) tells the reader what records need to be read from the card in order to conduct the transaction.

In steps 307 (representing "n" READ RECORD commands), a large amount of data is read from the card, using the series of READ RECORD commands, in a manner well-known in the art. Step(s) 308 show(s) return of the records that have been read.

In step 317, the reader provides an unpredictable number (UN), and transaction details (including Amount and Currency Code) and asks the card to compute an application cryptogram (in EMV, this is done using the GENERATE AC command). In step 318, the card responds with an application cryptogram that allows the transaction to be completed. In addition, the reader can obtain a certified copy of the card's public keys from the READ RECORDS, and can then optionally ask the card to sign the transaction in step 317, giving a signature over the transaction data in steps 317 and 318 that the terminal can check.

The process just described will now be reiterated and summarized. There is an initial exchange where the card and reader work out how to communicate and establish communication. Then, the application is selected at 303, wherein a "SELECT" command is sent from the reader to the card, giving the card the identity of the application the reader wants to select. The reader gets a response from the card at step 304 that says (the terms "say," "talk," and the like being understood to contemplate electronic communication), in essence, "here is a brief description of the card application." The reader then sends the "GET PROCESSING OPTIONS" command to the card in step 305. This is, in colloquial terms, the reader saying to the card "I would like to conduct a transaction; let us work out the details of how we should proceed"; the reader says to the card "if you asked for any details to determine how we should communicate, here are those details," and the card says to the reader, in step 306, "here is the information that you need in order to know how to proceed with the transaction." The information basically tells the reader what to read from the card and what the context of the transaction is.

In step(s) 307, the reader takes from the card all of the information it needs, via a series of instructions called "READ RECORD." The data obtained includes the primary account number (PAN), expiry date, track data, and a series of RSA certificates that allow verification of the authenticity of the card's data. The data obtained may also (optionally) include a PAN Sequence Number which in combination with the PAN uniquely identifies the card.

The application cryptogram returned in step 318 may be based, in part, on the application transaction counter (ATC), which is a counter in the chip card, two bytes long, which increments every transaction, and is a fundamental security mechanism employed with both contacted and contactless chips. It is one wherein the card and issuer can ensure that cryptograms received from the card are not "old" cryptograms; i.e., the ATC can be used to ensure that a cryptogram produced by the card is not a previous cryptogram. Stated in another way, one of the things that would not be desirable is for a card to produce the same cryptogram that it produced for a previous transaction. By including the ATC in the cryptogram, it is ensured that the card will never produce a cryptogram that is the same as a previously-produced cryptogram.

In addition, the skilled artisan will appreciate that the unpredictable number (UN) sent in step 317 is a four-byte number which provides a way for the terminal to ensure that the transaction is not replayed but rather is fresh. It is part of what is known as a challenge and response protocol, wherein the terminal sends an unpredictable number to the card, and the card will include that number in its cryptogram, which is sent to the issuer for authorization or clearing. In parallel with that, the terminal sends the unpredictable number to the issuer, and the issuer uses same as part of verifying the cryptogram.

As shown at 351, pertinent data (typically, a suitable card identifier, account-related data, and transaction-related data) is supplied by the reader to the terminal for inclusion in the authorization request or clearing record. If the cryptogram generated by the card that is included in the pertinent data is an ARQC (Authorization ReQuest Cryptogram) it is included in an authorization request sent to the issuer 2010 at 353. The authorization request 353 and response 355 may conform, for example, to the ISO 8583 standard (proprietary sub-elements may also be included in some cases, as will be appreciated by the skilled artisan). If the cryptogram generated by the card that is included in the pertinent data is a TC (Transaction Certificate) then the transaction has been completed successfully and the terminal sends the data to the issuer in a clearing record.

In some instances, the pertinent data that is supplied by the reader to the terminal for inclusion in the authorization request or clearing record comprises transaction data from the card and reader including, for example, one, some, or all of AIP, PAN, PAN Sequence Number, Application Expiration Date, Cryptogram Information Data (CID, which is the type of cryptogram produced—TC, ARQC, or AAC), Application Transaction Counter (ATC), Application Cryptogram (AC), and the Issuer Application Data (IAD, which is proprietary and in the case of the MasterCard® M/Chip specification includes version numbers, the results of the card's internal processing including the Card Verification Results and optionally risk management counters/accumulators), Terminal Verification Results (TVR), Unpredictable Number (UN), Transaction Date, and Transaction Type.

For the avoidance of doubt, unlike the standard credit authorization process, wherein communication with the issuer is carried out for authorization of the transaction, in one or more embodiments, the transaction is authorized locally based on an on-card balance and the merchant initiates clearing and settlement at a later time.

In a standard EMV transaction flow, the payment application is selected by the terminal, as at 303; the transaction is initiated by performing a GET PROCESSING OPTIONS command (the terminal sends this command to the card, as at 305). That returns to the terminal the AFL, as at 306 (including which bits of data the terminal needs to read in order to perform the transaction) and the terminal reads the relevant pieces of information from the card as at 307, 308. The transaction is finally concluded by performing a GENERATE AC command at 317; in this command, the terminal specifies to the card that it wants the card to sign up to payment for the transaction (in a certain currency code, amount, and other transaction related details) and the card carries out internal risk management calculations; if these indicate that the transaction should not be declined, the card returns to the terminal, at 318, the requested application cryptogram signifying the approval and conclusion of the payment. Typically, in a contactless environment, the card will sign the transaction data including the application cryptogram using its RSA keys such that the terminal can verify the authenticity of the card. In this final command, the terminal sends the request to be paid at 317, and it gets back from the card at 318 the response saying here essentially is your payment.

Difficulty may arise in that somewhere between receiving the command 317 and sending back the response at 318, the card needs to update its risk management parameters (typically one or more amount accumulators and transaction counters); i.e., essentially debit the card balance for the amount of the transaction. This can be done as close as possible in time to the final return of the response from the card to the terminal in 318, but essentially always has to be done prior to the card responding. There therefore exists the opportunity for the transaction to be "torn," wherein the final response from the card to the terminal at 318 never gets successfully to the terminal. In such case, the balance on the card has been debited, but the merchant has not received the proof of payment. This can occur, for example, if the card is removed by the cardholder too quickly; perhaps anticipating the completion of the transaction and taking the card away too quickly (such that the card is now out-of-range for RF communication); or there may be unrecoverable communications errors—for example, environmental noise or other factors may prevent final communication of the message 318. The end result is that the card has been debited of funds but the merchant has not been paid. It is also possible that if the cardholder removes his or her card very slightly earlier (prior to completion of processing of the GENERATE AC command 317), the card has not been debited with funds and the merchant has not been paid. In this case, in essence, "nothing has happened" since not only has the merchant not been paid, but also the card balance has not been debited. In this case, the cardholder can simply try again. However, the former case, where the card balance has been reduced but the merchant has not received payment confirmation, results in significant issues for pre-paid cards that have a specific offline balance.

Further comments will now be provided with regard to the above-mentioned risk-management parameters (card and financial risk management parameters). Typically, there is an accumulator, which is a running total of the amount of money spent offline so far. That is associated with a limit which sets forth the total amount which is allowed to be spent offline. The difference between the two is the amount that remains available to be spent offline. The amounts are typically denominated in an amount that is relevant for the country of issue of the card. In some cases, when transactions are conducted offline in another jurisdiction, it is not possible to convert the amount into the monetary unit of the country of issue. In some instances, this can be addressed by keeping a counter which permits only a limited number of this kind of transaction to occur. Thus, if a given transaction is in the same currency as the jurisdiction of issue, then simply add it to the accumulator, i.e., the running total of the amount of money spent offline so far. If a given transaction cannot be handled in this manner, e.g., is not in the same currency as the jurisdiction of issue, then add it to the count of the number of such transactions (a limit is specified as to the number of such transactions permitted before the issuer is contacted). In general, the above-mentioned risk-management parameters will typically always include at least one parameter which is indicative of a remaining spendable amount. A non-limiting example is as discussed just above, where there are two such parameters, namely, the accumulator and the limit. In some instances, the parameter(s) could indicate the amount remaining to spend in some other fashion, such as keeping it directly rather than as the difference of two other parameters. Furthermore, there may be multiple counters and/or accumulators used for different types of transactions at different times.

Thus, one or more embodiments address the case of a "smart" (chip) card (or other payment device), which, in a typical case, is contactless (but could also be contacted or of a dual interface design). There is a balance stored on the card. The card can normally complete transactions offline by debiting the off-line balance. The terminal sends a GENERATE AC command to the card, as at 317, causing the card to debit its off-line balance and send secure data to the terminal, as at 318, which allows the merchant to subsequently provide that secure data to the issuer to obtain payment, as at 353, 355, noting that here the message to the Issuer would be a clearing message not an authorization request, and there would be no authorization response. Meanwhile, the available off-line balance on the card is decremented. One or more embodiments address the situation wherein the off-line balance has already been decremented but the merchant has not yet received the secure data that will allow the merchant to subsequently obtain reimbursement from the issuer (for example, contactless card moved out of range, or contacted card removed from reader, after step 317 and subsequent balance decrement, but prior to completion of step 318). It should be noted that CDA (Combined DDA/Application Cryptogram Generation), where DDA stands for Dynamic Data Authentication, is also typically requested from the card by the terminal and used by the terminal to validate authenticity of the card itself, i.e., that the card is not a copy.

One or more embodiments introduce a new command, which may be referred to, for example, as the RECOVER AC command. It should be noted however that it would also be technically possible to also reuse the GET PROCESSING OPTIONS or GENERATE AC commands by making proprietary extensions to their parameters to implement the same functionality. In one or more instances, the new RECOVER AC command is made available for use by a terminal in order to get the card to essentially repeat the process of delivering that final payment confirmation message 318 to the terminal. Each card has a unique identity personalized into it, in terms of its primary account number (PAN) and any associated PAN sequence number—these can potentially be combined into one unique data item for data storage purposes—the Data Storage ID—basically a unique identity for the card.

Note for completeness that for certain Data Storage applications a Data Storage ID (DSID) comprises the combination of the PAN and PAN Sequence Number so that the terminal can verify the DSID against the PAN/PAN Sequence Number which are signed by the issuer. However, for the recovery of torn transactions in accordance with one or more embodiments of the invention, the card or other payment device can be uniquely identified by any unique card identifier personalized in the card, the combination of the PAN and PAN Sequence Number being but one preferred but non-limiting example.

Figure 4:
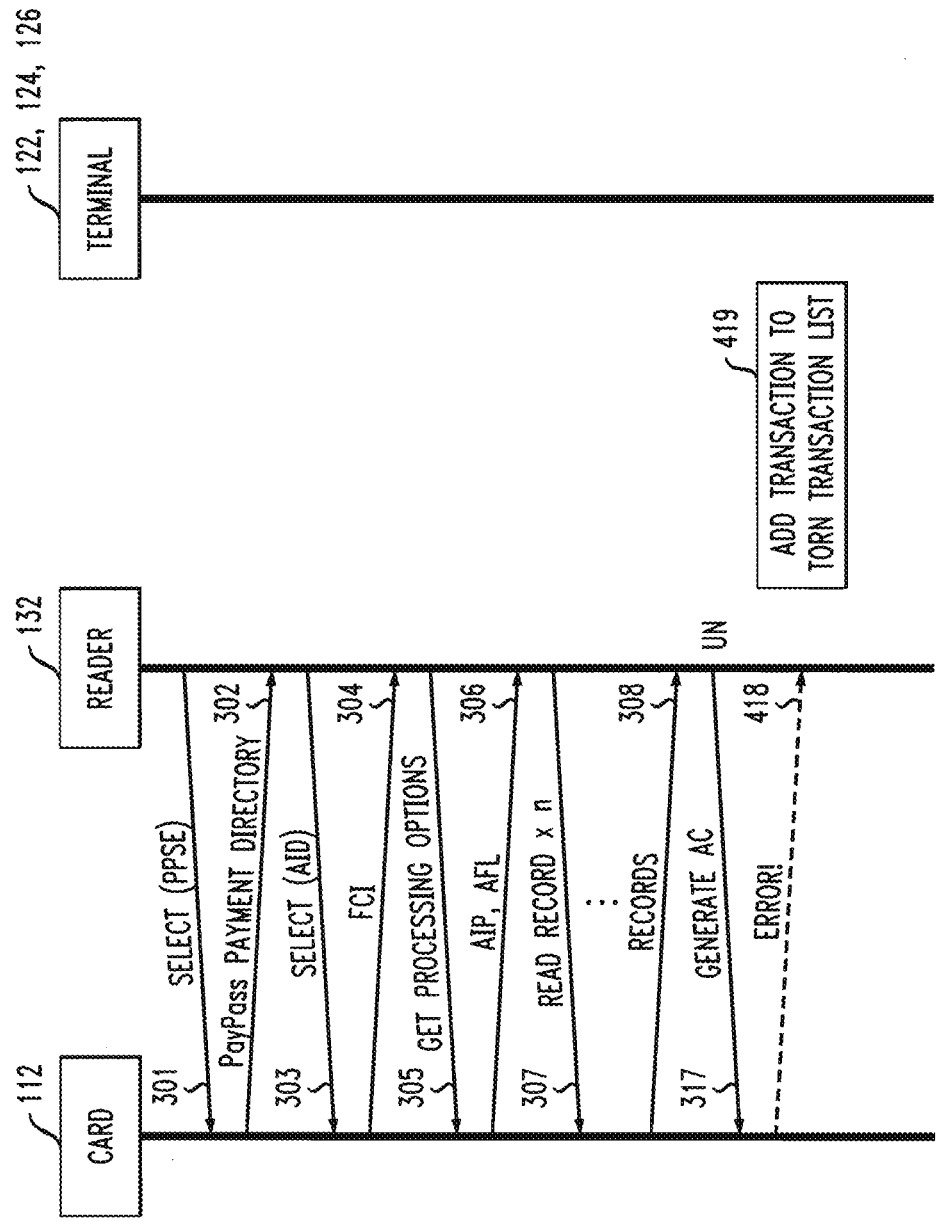
FIGS. 4 and 5 are exemplary message flow diagrams according to aspects of the invention.

When the card is being used in an initial payment transaction, the terminal sends the GENERATE AC command as usual, but if it does not get the expected response 318 from the card, because the transaction has been torn, the terminal can remember the fact that there is a potential issue with this particular card having this particular identity. This aspect is depicted in FIG. 4, wherein elements similar to FIG. 3 have received the same reference character and are not described again. As indicated at 418 therein (labeled "ERROR!") the expected response to command 317 is not received due to tearing. In response to this, the transaction is added to the torn transaction list, as at 419, by the terminal and/or reader.

Figure 5:
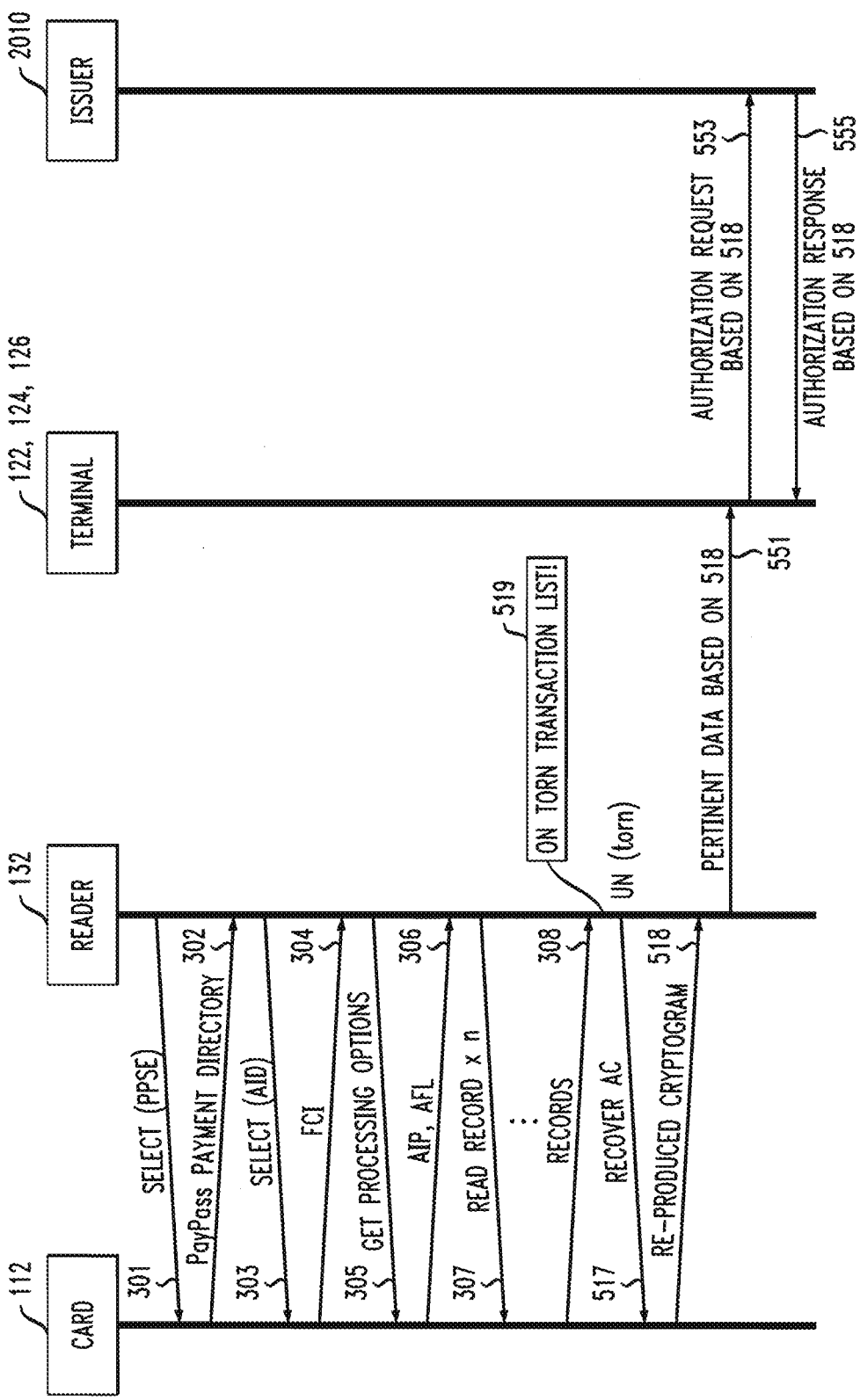

As seen in FIG. 5, when that card is re-presented for purposes of attempting to recover the torn transaction, the terminal can identify that it is the same card with the same identity as was used in the transaction that was torn and not completed successfully, as at 519. The check to see if this card is associated with a torn transaction can be carried out whenever the terminal has obtained the unique card identity (e.g., PAN and if present PAN sequence or the like) from the card (for example, at the end of the READ RECORD commands and responses). By having the terminal use the RECOVER AC (or similar) command at 517, and by having the terminal supply, in such command, the same data item in terms of the unpredictable number UN (random number the terminal generates that is used uniquely for each transaction) that it supplied for the specific torn transaction (UN(torn)), the card can then see if that transaction was indeed torn, i.e., it got to a stage in the transaction where it had debited the off-line balance but the terminal may not have received the response message returned at 318. The card will have recorded the unpredictable number at the same time (atomically) as updating its balance during the initial transaction. The card will have stored any other items of data it needs to re-produce the payment transaction response to the terminal. It should be noted that while the provision of the Unpredictable Number is a convenient way to maintain flexibility for future changes to the torn transaction recovery mechanism without the need to make coding changes to the terminal, it could be omitted or other data could be used either as well or instead of the Unpredictable Number. The Unpredictable Number is useful, though, in avoiding confusion by allowing the card to determine that it is the transaction that was performed by this terminal that has been torn and can be recovered.

In one or more embodiments, the card basically stores, along with and atomically with decrementing its balance, all the necessary data needed to recover the transaction should the transaction be torn. When the terminal sees that the same card is being re-presented, the terminal supplies the same unpredictable number (UN(torn)) to the card that it used in the original transaction; the card can determine if it has the necessary data for that particular transaction so that it can be recovered, and if the transaction was indeed torn (in terms of the on-card balance having been decremented by the card and the card-stored data matching that supplied by the terminal in the RECOVER AC command), the card is able, at 518, to use that card-stored data to reconstruct and retransmit the response to the payment terminal. The payment terminal can then validate that response in exactly the same way it was hoping to do with the original GENERATE AC command, and obtain the necessary proof that the card is authentic, and the necessary data that it needs for authorization or clearing and getting paid, as at 551, 553, 555 wherein pertinent data is supplied from the reader to the terminal as before, except based on the re-produced response (the authorization request and response are also based on the re-produced response).

If, however, the transaction was torn earlier, such that the card's balance was not yet decremented, and the details of the transaction (UN and other details) were not stored by the card, then the RECOVER AC command will return an error, indicating to the terminal that this transaction cannot be recovered; in such case, the terminal knows that it can simply repeat the GENERATE AC command to essentially request payment again. In this way, the terminal should equally get a response from the card which proves the card's authenticity and provides the data needed for authorization or clearing. Again, all is well, since card has been debited and the merchant has received the proof of authenticity and clearing data that the merchant requires for the transaction. Note that in one non-limiting approach, only the last transaction performed can be recovered, while in other instances, the terminal or a server may maintain a list of one or more transactions that may be recovered, as alluded to at 519 (if no multiple-entry list is used, the last torn transaction may be stored and checking of the card may be carried out against the single entry).

In some instances, re-presentation to recover the torn transaction will be carried out with the same terminal from which the card was just torn, shortly after the tearing occurs; the terminal may prompt the user to re-present his or her card. In other instances, a terminal may store a short list of torn transactions that it is interested in recovering. Consider, for example, entry to the underground, metro, subway, or the like. If something goes wrong with a transaction attempted by a particular individual, the person in line behind such individual may want to pass through the turnstile, fare gate, or the like before the individual has a chance to re-present his or her card to recover or repeat the transaction. Therefore, it is possible for the terminal to maintain a (typically very) short list of torn transactions. When the terminal sees the identity of a card, it can check to see if the card is on the list of torn transactions that it may be desirable to recover. This list will generally be short and it will not be relevant to retain it for a long period of time—perhaps for a few minutes (sufficient time for the card to be retrieved from wallet or purse and re-presented to the terminal). In such cases, the terminal may be provided the ability to recover more than one torn transaction. Examples of the size of the torn transaction list and the length of time that it is maintained are provided for exemplary purposes, and are not intended to limit the scope of the claims unless expressly recited therein. Other embodiments might use larger or smaller lists retained for shorter or longer periods of time.

By way of summary, in one or more non-limiting embodiments, the terminal could store more than one torn transaction for some reasonable period of time, on the order of minutes rather than hours or days. Furthermore, there may be a number of coupled terminals connected to a server—for example, the terminals could be LAN-ed to a server at an underground, metro, or subway station, and the torn transaction list could be on the server. An example of this situation is given in FIG. 6, wherein a number of readers 132 and terminals 126 are provided in association with turnstiles 661 to control access to a subway or the like. The terminals and readers are coupled, via local area network (LAN) 663, to a suitable server 665 with the torn transaction list.

Thus, by having the card store some additional data at the same time that it debits its balance, i.e., storing the necessary data needed to recover the transaction, and by having a mechanism whereby the terminal is able to identify the card, consult the torn transaction list to see if this card is associated with a torn transaction the terminal is interested in recovering, and by having a command (e.g., "RECOVER AC") that the terminal can send to the card to essentially repeat and recover the last part of the transaction processing, it is possible, in accordance with one or more embodiments of the invention, to successfully restore the completion of the payment, ensuring both that the cardholder is fairly charged and that the merchant is able to receive payment for the goods and/or services.

Note that in one or more embodiments, the card stores the terminal's unpredictable number (UN) when the balance is decremented, and the terminal supplies that UN (UN(torn)) when it seeks to recover the transaction, so that the card can tell that the UN provided by the terminal matches the UN that was stored by the card when the last transaction was performed and the balance decremented and therefore that it is the same transaction that has been torn and which can be recovered. However, it is not necessarily the UN and only the UN that is re-supplied by the terminal. Some embodiments include in the card's data a new data item, which may be referred to, for example, as the DRDOL (data recovery data object list), a parameter in the card that tells the terminal what the terminal needs to provide to the card in order to recover the transaction. In some instances, a single data item, the terminal UN, needs to be supplied (whatever needs to be supplied can be stored, for example, at 419, and provided to the card at 517). However, other data items can be added to a list, such as the DRDOL, so that more information is returned from the terminal as it seeks to recover the transaction—for example, the current date and time could be supplied (in some embodiments, there could be time limits on recovering transactions). The inclusion of DRDOL also is one simple way that the card indicates to the terminal that the recovery mechanism is available and supported by the card. There are of course many other similar ways to do this, which will be apparent to the skilled artisan given the teachings herein, or the terminal could find out by trial and error. Because the card has told the terminal what data items it (the card) needs in order to recover a transaction, the card is, in effect, also advising the terminal that it has the capability to recover the transaction (e.g. the card is not an old-fashioned card that lacks the ability to implement the recovery mechanism). Note that DRDOL could be provided in any response from the card but the simplest approach is to include it in one of the records read from the card in step 308.

Note also that the UN can, but need not always, be present in the DRDOL. Ideally, a parameter should be used which has high probability of uniquely identifying the transaction so the card can verify that the required transaction can be recovered. The Date and Time of the transaction could also be used for this purpose in some instances.

During the original torn transaction, if the terminal was not given the DRDOL by the card, it would know ab initio that this was an old-fashioned card that was not capable of recovery. If the terminal was given the DRDOL by the card it would also be advised exactly what data would be needed to recover the transaction in the future (e.g., the terminal UN used in the transaction). Therefore the terminal stores the UN(torn) in the torn transaction list, indexed by the card identity. Again, during the initial transaction, the card advises the terminal what data it will need to recover the transaction if torn (the UN, date, time, etc.) and the terminal will know to store this in the torn transaction list. The following is an exemplary torn transaction list, with the first two columns presented as relatively small numbers in base 10, purely for illustrative convenience:

| CARD IDENTIFIER | UN(torn) | Date | Time |
|---|---|---|---|
| 1234 | 853 | 02072010 | 034508 GMT |
| 5678 | 135 | 03072010 | 111553 GMT |
| 9101 | 876 | 08052010 | 141127 GMT |

In addition, if the terminal intends to recover transactions performed using CDA then the terminal would store in the torn transaction list either the Transaction Data Hash Code of the transaction, or all the data elements required for the terminal to recalculate the Transaction Data Hash Code, where the Transaction Data Hash Code is as specified in the EMV Specifications (cryptographic hash of all of the data that is used in the transaction). The Transaction Data Hash Code is a non-limiting example in the case of EMV, it being understood that in the most general case, what could be provided includes all the actual transaction data, portions of the actual transaction data, a hash of all the actual transaction data, a hash of portions of the actual transaction data, or some combination thereof.

In one or more alternative embodiments, the terminal is not required to supply any data to the card in the RECOVER AC command. In this design, the card tells the terminal the identity of the transaction it has available to be recovered (e.g. the ATC value, the UN, and/or the Date & Time of the torn transaction) in the GET PROCESSING OPTIONS response. When a transaction is torn the terminal records the value(s) seen during this first transaction in the torn transaction list. When the card is re-presented, the terminal can see that the transaction identity value(s) have changed compared to what is stored in the torn transaction list and therefore that there is a new torn transaction stored in the card that could be recovered, i.e., that the terminal was responsible for determining that the transaction could be recovered rather than the card so does not need to send anything to the card. Thus, in this "reversed" case, the card provides the terminal with an indication of which transaction it is able to recover (e.g. the UN associated with the last transaction it performed) and the terminal determines if it is a new torn transaction inasmuch as the transaction identity value(s) reported by the card (e.g. the UN associated with the last transaction it performed) are different from those that were returned by the card, and recorded in the torn transaction list, when the card was first presented and requests recovery of the transaction. Depending on the data elements included in the transaction identity information returned by the card the terminal may also confirm that that these correspond to the expected torn transaction (e.g. if UN of the last transaction is reported by the card in the transaction identity values that it matches UN(torn)) and only request recovery if it matches. This is possible for some transaction data elements that are known to the terminal (e.g. UN or Date & Time) but not for the ATC which only becomes known to the terminal when the GENERATE AC response has been successfully received by the terminal and therefore is not known for a torn transaction. In the case where the ATC of the last transaction is used as the transaction identity information the terminal can request recovery on the basis that the value is different rather than matching any specific value.

Thus, in a presently preferred embodiment, the terminal receives the identity of the card, and the terminal, based on same, determines if there is a torn transaction, as well as the identity of the transaction which is to be recovered. The terminal then provides this to the card to indicate that this is the torn transaction that it is desired to recover, and to determine whether the data needed to recover same is present on the card, and whether the transaction was in fact really a torn transaction. In an alternative "reversed" embodiment, the card, in addition to providing its identity to the terminal, also identifies a torn transaction that the card has available to recover. The card identity and torn transaction identity would not necessarily always be provided at the same time; in a preferred but non-limiting embodiment, the identity of the transaction is likely to be in the GET PROCESSING OPTIONS response and the card identity included in the READ RECORD responses. The terminal can then compare the identity of the transaction to what is present in the terminal's torn transaction list. In sum, rather than the terminal providing to the card the identity of a putative torn transaction that the terminal seeks to recover, the card provides to the terminal the identity of a torn transaction that it (the card) is capable of recovering. The remainder of the mechanism is similar in both embodiments.

By way of review, currently, when a card is used for a contactless transaction, the update of the counters on the card is done prior to transaction completion. In the event that a transaction subsequently fails to complete, the state of the card's offline counters will be incorrect: it (e.g., the balance) will have been decremented on the card but the merchant will decline the transaction. Three scenarios are identified:
1. The card is removed from the field (or contacts) before the transaction is completed at card level: the card had not yet updated its counters nor sent the final response to the terminal.
2. The card is removed from the field (or contacts) before the transaction is completed at card level: the card updated its counters but did not have the time to prepare and send the final response to the terminal.
3. The card is removed from the field (or contacts) after the transaction is completed at card level, i.e., the response was prepared and sent to the terminal, but the response was never received by the terminal.

In one or more embodiments, scenario 3 above is addressed not solely by changed processing behavior on the card but also requires changed processing behavior on the terminal (since the card is actually unaware of the terminal not receiving the response sent by the card).

In one or more embodiments, the transaction flow (internal to the card application) is enhanced to minimize the window of opportunity (period of time) during which the issue described in scenario 2 can occur (i.e., to minimize the time between the moment when the counters are updated and the moment when the card has sent the answer to the terminal). In a preferred approach, all the persistent data is updated, together with the sending of the response for the GENERATE AC, in one atomic operation. Note that "persistent data" in this context refers to accumulators, counters, transaction log entry, security flags, and checksums, but excluding the security counters. One or more instances can choose an appropriate method through which this goal is achieved, depending on their card operating system and application characteristics.

By bringing the counter updates (in non-volatile memory) closer to the moment that the card sends its response, it will be less likely that a card will update its counters before it sends a response. But it is still possible for the card to start sending, or even complete sending, its response but for that response not to be received by the terminal as a communications error may occur which can not be recovered as the card has been withdrawn. In this case, the card counters have been updated but the terminal doesn't know this. In case of a credit product, the terminal may start the transaction again. The card counters will be incremented again as part of this second transaction but this is not a significant issue (in the case of credit, the counters are tools to manage the risk, not to manage value). In the case of offline pre-paid (and to a lesser extent for pre-authorized), unduly incrementing the card counters becomes an issue, especially if the customer starts consulting his or her balance.

During the transaction process, the card should store the necessary data of the last transaction in non-volatile memory so that, in the event of a tear and re-presentment of the same card, the terminal can:
1 Detect that it is in fact the same card being re-presented.
2 Detect whether the card supports the recovery mechanism.
3 Detect whether the card completed the previous transaction.
4 Recover the necessary data to create a clearing record.

This exception process preferably provides the terminal with the same quality of the data (integrity & authenticity) as would be provided without a tear. In one or more embodiments, the recovery mechanism is supported for SDA (static data authentication), DDA (dynamic data authentication) and CDA (combined DDA/application cryptogram generation) transactions and is independent of the cryptogram provided by the card (TC (transaction certificate), ARQC (authorization request cryptogram), AAC (application authentication cryptogram)). The functionality is preferably available on both the contact and contactless interfaces, even though tearing may be more of an issue in the contactless case. The functionality is preferably activated via personalization of the card and preferably allows activation of the functionality on either or both of the contact and contactless interfaces.

Again, by way of review, "tearing" refers to a card with an on-card balance which is removed from the field (for contactless transactions) or from the chip card reader (for contact transactions) before a transaction is completed: the card updated its balance but did not have the time to prepare and send the final response to the terminal or the card's response was not received by the terminal. One or more embodiments provide a mechanism which restores the card's accumulators and/or counters to their previous values, eliminating the inconsistency of the card's balance. Tearing can also take place during transactions conducted for other purposes, such as data storage, authentication, data integrity validation, or the like. Such transactions may have zero monetary value and may be performed to authenticate data from the card.

In a preferred approach, all the persistent data is updated, together with the sending of the response for the GENERATE AC, in one atomic operation. Again, persistent data refers to accumulators, counters, pointers to log, security flags, checksums, but excepting the security counters. Different instances may achieve this goal through a variety of techniques, depending on the card operating system and application characteristics.

Within the scope of the discussion immediately below, the following terminology is used:
Torn transaction—Transaction for which the card's accumulators and/or counters were updated after the card risk management (CRM) and the response to the GENERATE AC was correctly computed by the card but has never arrived at the terminal.
Card recovers torn transaction—A card is said to "recover" a torn transaction when it can send to the terminal a re-produced response to the GENERATE AC of the torn transaction (note that the response to the Recover AC does not need to be identical to the response to the original GENERATE AC (e.g. if it was a CDA transaction the signature could be recalculated using a different ICCDN and therefore have a different value but the same meaning)).

Terminal recovers torn transaction—A terminal is said to recover a torn transaction when it accepts the re-produced response to the GENERATE AC of the torn transaction.

One or more embodiments provide a mechanism that recovers a torn transaction to a state consistent for all parties, such that:

The terminal obtains a valid clearing record.

The cardholder perceives an accumulator and/or counter balance consistent with the history of the transactions carried out.

One or more embodiments of the torn transaction recovery mechanism are suitable for contactless pre-paid and/or pre-authorized offline products with consistent balance view for the cardholder.

It should be noted that including the recovery mechanism in the application flow adds an extra processing time for the storage of the required recovery data in the card's non-volatile memory. Therefore, the issuer is preferably afforded the option of including or not including the recovery mechanism in the application processing flow, depending of its need to support pre-paid and/or pre-authorized products with a consistent balance view.

In one or more embodiments, the card is provided with a set of flags that may be personalized by the Issuer to configure the features supported by the card, commonly referred to as "application control," including settings which control the operation of the on-card payment application. One bit may be assigned to enable and disable 'Torn Transaction Recovery'; for example, when personalized with the binary value "1" the torn transaction recovery mechanism is activated in the card flow, otherwise (binary "0") it is not.

Some embodiments can have the following constraints:

The card can recover a torn transaction only on the terminal where the torn transaction was carried out.

The card can recover a torn transaction which was carried out no more than one transaction before.

The terminal can recover any torn transaction among the last M torn transactions recorded in its log, where M is an arbitrary number of transactions (in some cases, M may be in the range such that $1 \leq M \leq 100$ but this is purely for illustrative purposes and as noted, in general, M is an arbitrary number of transactions).

The writing of the data elements needed for the recovery of torn transactions (which, in one or more embodiments, are logically grouped in a "recovery" data structure) in the EEPROM (or other memory) of the card is preferably performed atomically with the updating of the accumulators and/or counters of the card and with the computation of the response to the GENERATE AC command.

In one or more embodiments, the terminal considers that a transaction may be torn when it receives no response to the GENERATE AC C-APDU (command application protocol data unit) in a given response time. In at least some instances, the terminal manages a log of M torn transactions. Each transaction initiated by the terminal is temporarily recorded but is registered in the log only if the transaction may be torn. Each record in this log is structured as follows:

PAN and PAN Sequence Number—the unique identifier of a card engaged in a torn transaction.

UN—the unpredictable number generated by the terminal during the torn transaction.

Business context of the torn transaction:
Transaction Time
Transaction Date
Amount Authorized
Amount Other
Terminal Verification Results (TVR)
Transaction Type
CVM Results
DAC (data authentication code)
ICC (integrated circuit card) Dynamic Number (Note that the skilled artisan is familiar with all these parameters inasmuch as they are defined in the EMV specifications)

The terminal's context is the same for all torn transactions, i.e.:
Terminal Country Code
Terminal Type
Merchant Name and Location
Transaction Currency Code (in the case of a multi-currency terminal, when this code may change, the Transaction Currency Code may be registered within the business context of the torn transaction)

The terminal's context is preferably always available to any recovery transaction initiated by the terminal. The log of torn transactions is preferably managed as a cyclic file, in which the log record written by the oldest transaction is overwritten by the most recent transaction. The log preferably stores at least one hundred records, but of course, this may vary in other embodiments.

The terminal checks, for each transaction, the existence of a record in the log of M torn transactions corresponding to the PAN and PAN Sequence Number of the card. If such a record is found, the terminal preferably always assumes that the accumulators and/or counters in the card application were updated during the transaction and hence that the transaction was torn. Therefore, the terminal initiates a recovery transaction. This is achieved, for example, using the RECOVER AC command discussed elsewhere herein.

If the response to this command is a status word (SW12) having a first predetermined value, the terminal knows that the accumulators and/or counters in the card application were not updated during the last (assumed) torn transaction; therefore, the terminal will simply send a new GENERATE AC using the same transaction context as for the (assumed) torn transaction, but using a fresh UN. Otherwise (for example, the status word in the response not having the first predetermined value but instead having a second predetermined value), the terminal knows that the accumulators and/or counters in the card application were updated by the CRM during the last torn transaction. Therefore, the terminal will not initiate a new GENERATE AC, but it will process the response of the RECOVER AC command as it would have processed a response to the original GENERATE AC command. In one or more embodiments, the state of the card (for example if coded according to a Finite State Machine (FSM)) processes the RECOVER AC command in the state obtained after successful processing of the GET PROCESSING OPTIONS command in step 305, 306; after the execution of the RECOVER AC command, the state of the FSM, in at least some instances, stays in the same state.

As noted elsewhere, in one or more embodiments, recovery from the torn transaction is carried out by having the terminal send to the card a RECOVER AC command including the data elements requested in the data recovery data object list (DRDOL). When the recovered response was generated with CDA, the response message is preferably encoded as a response message template as presented in the EMV Specifications including the cryptogram information data (CID), application transaction counter (ATC), signed dynamic application data, and issuer application data (IAD) which itself preferably includes the key derivation index (KDI), cryptogram version number (CVN), card verification results (CVR), data authentication code/integrated circuit card (DAC/ICC) dynamic number, and accumulators and/or counters, encrypted or in plaintext. When the recovered response was not generated with CDA, the response message is preferably encoded as a response message template including the cryptogram information data (CID), application transaction counter (ATC), application cryptogram, and issuer application data (IAD) including the same components just listed.

When the card receives the recovery-related data in the application protocol data unit (APDU) of the RECOVER AC command, the card application preferably performs appropriate checks, including verifying that 'Torn Transaction Recovery' functionality is activated on the card. If verification fails, the card will prepare a response containing an appropriate status word (SW12) to indicate to the terminal that the transaction cannot be recovered. Otherwise, the payment application on the card retrieves the UN(torn) from the command data received from the reader in the RECOVER AC command and checks whether the same value is recorded in the card's recovery data structure, i.e., UN(torn)=UN(Recovery). If there is no match found, the card application again will prepare a response containing an appropriate status word (SW12) to indicate to the terminal that the transaction cannot be recovered. Otherwise, the application on the payment card retrieves all the items of the recovery data structure as stored in the EEPROM (or other memory) of the card.

With the retrieved items, the card proceeds with the following processing:

If CDA was performed in the last torn transaction, then: as shown in EMV specifications compute the ICC Dynamic Data as the concatenation of appropriate data elements including all, or a subset of bytes of, the ICC Dynamic Number (freshly computed by the card application in the GET PROCESSING OPTIONS), the cryptogram information data (CID) for the recovery, the application cryptogram for the recovery, and a hash code for the recovery. Compute the Dynamic Application Data to be Signed just as for the GENERATE AC, except that the ICC Dynamic Data is that just computed. The UN is that corresponding to the initial torn transaction, i.e., UN(Recovery). Produce the Signed Dynamic Authentication Data corresponding to the freshly computed Dynamic Application Data to be Signed, using the ICC Private Key. Form the response of the command as for the GENERATE AC for the case where the recovered response was generated with CDA, wherein: CID is CID (Recovery), ATC is ATC (Recovery), Signed Dynamic Application Data is the value just computed, and the IAD (Recovery).

If CDA was not performed in the last torn transaction, then: form the response of the command as for the GENERATE AC for the case where the recovered response was not generated with CDA, wherein: CID is CID (Recovery), ATC is ATC (Recovery), Application Cryptogram is Application Cryptogram (Recovery), and the IAD (Recovery).

In one or more embodiments, the current values of accumulators and/or counters are not affected by the processing of the RECOVER AC command.

When the terminal receives the response described for the case where CDA was performed in the last torn transaction, the terminal proceeds conventionally to the verification of the Signed Dynamic Authentication Data, and if the verification passes successfully, then a transaction clearing record is registered in the terminal as for any successful payment transaction.

When the terminal receives the response described for the case where CDA was not performed in the last torn transaction, a conventional transaction clearing record is registered in the terminal as for any successful payment transaction.

In either case, the terminal deletes the corresponding record from the log of torn transactions.

Figure 8:
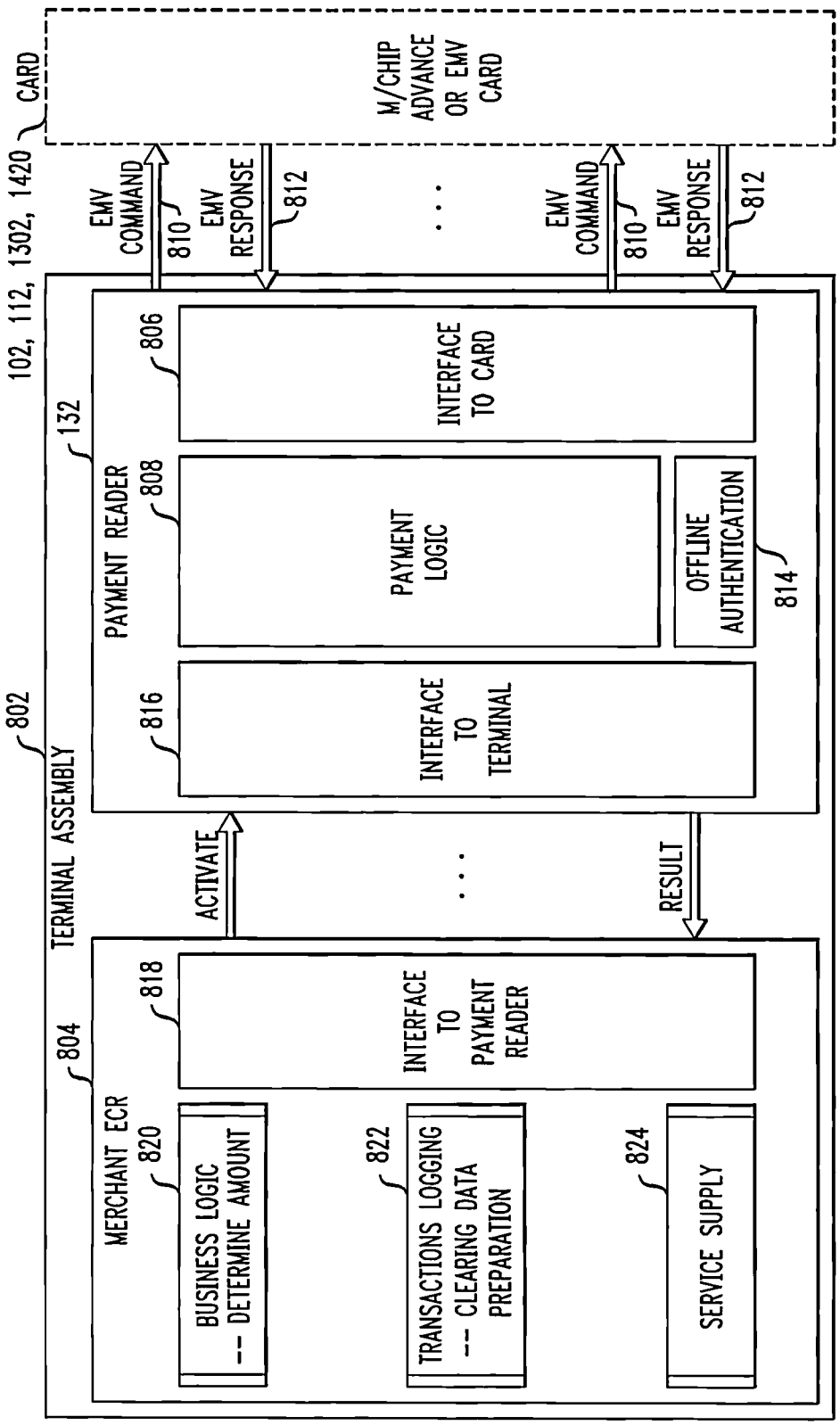
FIG. 8 depicts exemplary interactions between a terminal assembly and a payment card.

FIG. 8 shows a terminal assembly 802, including a reader 132 and a merchant's electronic cash register (ECR) 804, interacting with a card 102, 112, 1302 (or other payment device such as appropriately configured cell phone 1420). The interface 806 to the card may be, for example, an RF interface or a contacted interface. Payment logic 808 (referred to as the "kernel" in EMV and typically also comprising a payment application) may be implemented, for example, as firmware running on a processor of the reader 132; such firmware is configured to effectuate payment or other transactions by sending appropriate commands 810 to the card, in the appropriate sequence, as well as to handle responses 812 from the card. The offline authentication module 814 comprises the functionality for the payment logic to verify digital signatures received from the card, in order to ascertain that the card is authentic. Module 814 could also be implemented, for example, in firmware, and could be part of, or separate from but in communication with, the payment logic 808. Module 814 typically has a copy of the appropriate payment system public keys needed to verify the signed data from the card.

"Interface to terminal" 816 comprises a physical and logical connection between reader 132 and ECR 804. It may include a virtual interface and/or one or more wire connections, over which an appropriate protocol will run and over which data will be exchanged in accordance with the agreed protocol. In an integrated terminal assembly, the interface may still be physical or may simply be an application programming interface (API) to allow message interchange between pieces of software and/or firmware. "Interface to payment reader" 818 may be implemented, and may function, in a manner similar to "interface to terminal" 816. Business logic block 820 determines the amount of the transaction, for example. Transactions logging block 822 prepares and stores data needed to carry out batch clearing. Service supply 824 provides appropriate logic to open the cash draw of the register, open the turnstile of a transportation system in transport applications, and the like—in general, to provide the appropriate outcome of the transaction. Note that depending on a specific implementation, more functionality may be included in the reader 132 or more functionality may be included in the ECR 804. Modules 820, 822, 824 may be implemented, for example, in software or firmware on a processor or processors of ECR 804.

Example

In a non-limiting example, specific features are provided for recovery of torn transactions where a card, especially (but not limited to) a contactless card, is removed before the transaction completes and the terminal does not receive a response to its command 317 (e.g., GENERATE AC) as shown at 418. A torn transaction may lead to a de-synchronization between card and terminal and customer frustration if the customer notices that the balance of the card is debited but goods and/or services are not provided. In a non-limiting example, a recovery mechanism is provided, allowing the terminal to obtain a valid authorization or clearing record, without increasing the counters (and hence decreasing the balance) on the card.

In a non-limiting example, for a torn transaction, provided that the terminal supports the RECOVER AC functionality as well, the customer will be invited to re-present the card. The terminal will start processing as for a regular transaction (Select AID, Get Processing Options, Read Record). If the same card is used as for the torn transaction, the terminal issues the RECOVER AC command at 517 containing the Unpredictable Number (UN(torn)) of the last GENERATE AC command of the torn transaction. In one or more implementations, the RECOVER AC command can only be used once per transaction.

Support for the RECOVER AC command is activated in the Application Control and effectuates collection and storage of data during the GENERATE AC processing of each transaction. The data is stored in persistent memory and includes, among other items, the UN received from the terminal. This is used as the matching pattern between the torn transaction and the subsequent recovery transaction.

If the recovery mechanism is deactivated in the card, the RECOVER AC command will be rejected and the card returns a response containing a status word (SW12) indicating that recovery is not possible.

If the recovery mechanism is activated and the last card response was to a GENERATE AC command with the same UN value in its command data, then the card will respond to the RECOVER AC command. The response will contain the necessary data for the terminal to create an authorization or clearing record and will use the same offline Card Authentication Mechanism (CAM) as used for the torn payment transaction. As an example, if the terminal requested CDA in the GENERATE AC command of the torn transaction, then the card will return a CDA signature in the RECOVER AC response.

If the last response to a GENERATE AC command was not with the same value of the UN, the card will decline the recovery by returning a response containing a status word (SW12) indicating that recovery is not possible.

The data to be stored in persistent memory on the card in order to be able to recover the transaction with the RECOVER AC command is illustrated in the table below. Note that the ATC in this table is the ATC of the torn transaction and not the ATC of the recovery transaction. The card application only stores the last transaction and can therefore only recover the data linked to the last transaction. Different implementations may choose the optimal method to store these data elements.

Recovery Data List

| Data element | Length |
|---|---|
| Application Cryptogram | 8 |
| Application Transaction Counter | 2 |
| Cryptogram Information Data | 1 |
| Transaction Data Hash Code | 20 |
| Issuer Application Data | Variable |
| CDA Transaction Flag | 1 |
| Unpredictable Number | 4 |

When the 'Torn Transaction Recovery' feature is activated on the card, for example, by setting a suitable flag, during the card personalization process, the Data Recovery Data Object List (DRDOL) data element can be personalized in the AFL readable records with a suitable tag, length and list of data elements required by the card to determine if recovery is possible, for example, the UN. In one or more embodiments, the presence of the DRDOL in the AFL readable records will encode an appropriate indication that the card is capable of torn transaction recovery, and will contain a length (e.g., of two bytes), and a list of the tags of the data elements required for recovery (e.g. '9F37' corresponding to the tag for the Unpredictable Number).

Recapitulation

Figure 6:
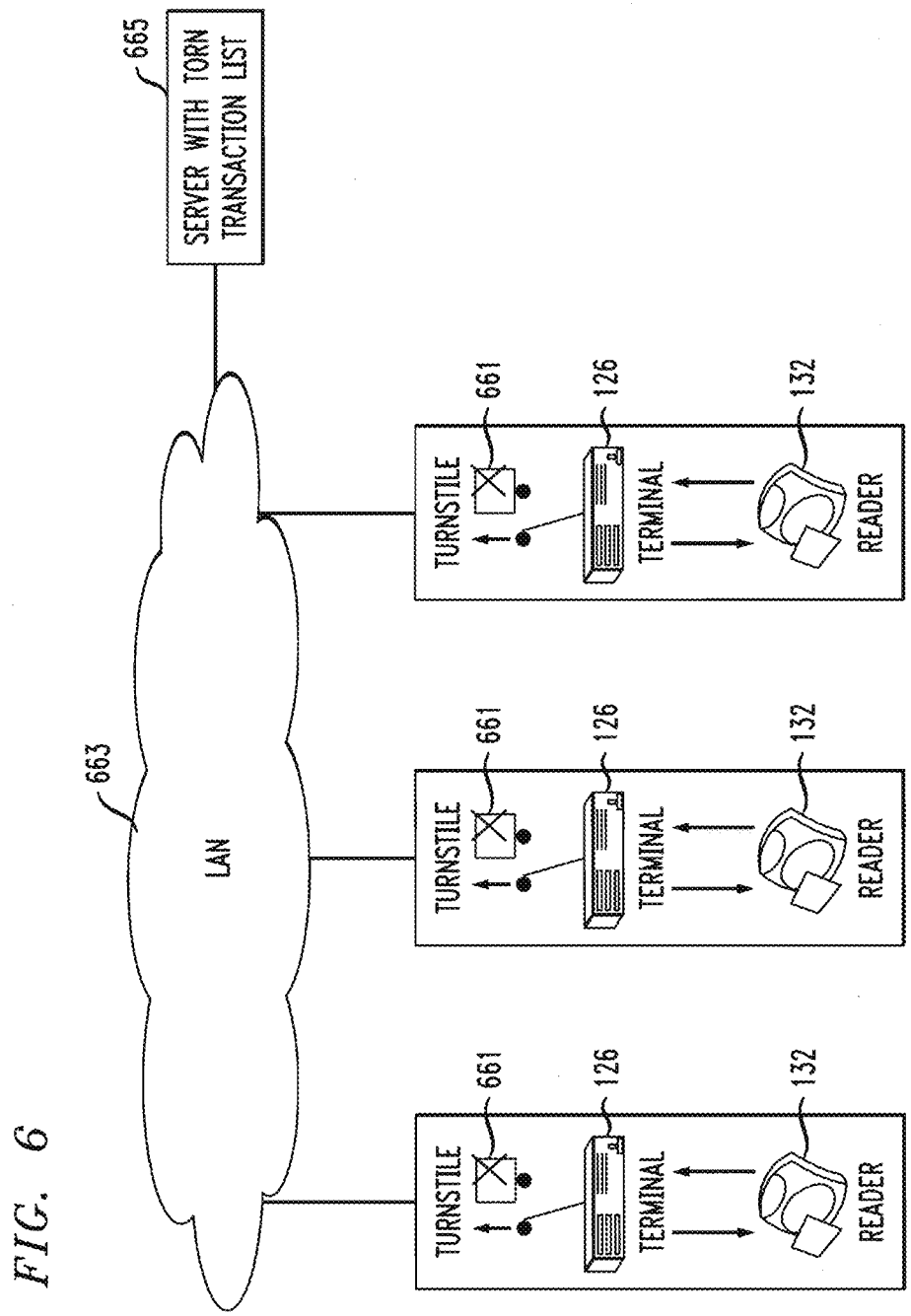
FIG. 6 is an exemplary block diagram, according to another aspect of the invention.

Given the discussion thus far, it will be appreciated that, in general terms, an exemplary method, according to an aspect of the invention, includes the step of facilitating initial presentation of a payment device (e.g., 102, 112, 1302, 1420) to a payment terminal assembly (e.g., a single terminal 122, 124, 126 or multiple interconnected collocated terminals as in FIG. 6; terminals here understood to include or be associated with a reader) in connection with a putative transaction, as described, for example, in connection with one or more of steps 301-308. The putative transaction may or may not have a monetary value associated with it. The payment device includes a payment device memory storing a device-side payment application, with an on-device balance, and at least one payment device processor coupled to the payment device memory. The payment terminal assembly includes a terminal memory (including, for example, software and/or firmware; in some instances, there may be a memory associated with a reader 132 and a memory associated with an ECR 804 or other terminal), storing a terminal-side payment application (e.g., 808, 814), and at least one terminal processor coupled to the terminal memory.

An additional step includes sending a first command from the payment terminal assembly to the payment device to compute a cryptogram to complete the putative transaction; a non-limiting example is step 317. The command may emanate, for example, from block 808 through block 806 as a command 810. A further step, such as at 418, includes detecting that the cryptogram is not received as expected (for example, block 806 may notify block 808). A still further step, such as at 419, includes, responsive to the detection, storing in a storage area of the terminal memory an identifier of the payment device and transaction recovery data associated with the putative transaction. In a non-limiting example, this step may be carried out using software and/or firmware in terminal assembly 802, such as in reader 132, ECR 804 or other terminal (including one or more of blocks 808, 820, 822). As used herein, "transaction recovery data associated with the putative transaction" includes both actual data of the putative transaction itself (e.g., in the presently preferred embodiment) as well as the card's identification of the then recoverable transaction (i.e., transaction card could have recovered at that time) as received from the card during the putative transaction (in the "reverse" alternative embodiment).

Yet further steps, as described, for example, in connection with FIG. 5, include obtaining, by the payment terminal assembly, the identifier of the payment device, upon re-presentation of the payment device to the payment terminal assembly (for example, block 808 may obtain same from block 806 which may receive a response 812); upon the re-presentation of the payment device to the payment terminal assembly, comparing, by the payment terminal assembly, of the obtained identifier of the payment device to contents of the storage area, such as at 519; and, conditioned at least upon the comparing yielding a match, sending a second command (and optionally, at least pertinent portions of the transaction recovery data) from the payment terminal assembly to the payment device, such as at 517. The second command instructs the payment device to re-produce the cryptogram to complete the putative transaction. As noted elsewhere, non-limiting examples of the second command are RECOVER AC, a modified GET PROCESSING OPTIONS command, a modified GENERATE AC command, and the like. The comparison of the obtained identifier of the payment device to the contents of the storage area can be carried out, for example, by software and/or firmware anywhere in terminal assembly 802, such as in reader 132 or ECR 804 or another terminal (for example, in one or more of blocks 808, 820, and 822), or both. However, results of the comparison are preferably provided to block 808 if block 808 does not carry out the comparison.

In a preferred but non-limiting approach, an additional step includes sending at least pertinent portions of the transaction recovery data from the payment terminal assembly to the payment device (for example, in step 517).

Additional steps can include facilitating the payment device determining whether the on-device balance was updated (in some instances, decremented) in response to the first command, and, in response to the payment device determining that the on-device balance was updated in response to the first command, facilitating the payment device responding to the second command with the re-produced cryptogram, such as at 518. In some instances, the payment device may also check whether it has the data needed to re-create the transaction, before responding to the payment terminal assembly.

For the avoidance of doubt, in one or more embodiments, in the case of CDA the cryptogram is the Signed Dynamic Application Data (which contains the Application Cryptogram) and in the case of non-CDA the cryptogram is the Application Cryptogram itself.

Further additional steps can include the terminal assembly receiving the re-produced cryptogram from the payment device, such as at 518; the terminal assembly preparing a transaction clearing record, based on the re-produced cryptogram, such as at 551 and 553; and the terminal removing the identifier of the payment device and the transaction recovery data for the putative transaction from the storage area (e.g., from the torn transaction list).

The transaction recovery data can include a terminal unpredictable number associated with the putative transaction. In some instances, the terminal may store recovery data for all transactions in volatile memory and write the data to non-volatile memory only if they are torn, or may also keep the recovery data in a separate area of volatile memory depending on implementation considerations. In some cases, the transaction recovery data further includes the date and time of the putative transaction. In some cases, the transaction recovery data further includes the transaction data hash code of the putative transaction.

In some instances, the storage area may be a simple data structure which does not include data from transactions other than the putative transaction. Where only a single transaction is saved, it may be possible to recover a torn transaction only if is the last transaction. Conversely, in some embodiments, the storage area comprises identifiers of additional payment devices and transaction recovery data associated with incomplete transactions other than the putative transaction. As discussed above with respect to FIG. 6, in some instances, the payment terminal assembly includes multiple terminals, and the storage area is accessible to the multiple terminals (e.g., it can reside on server 665 LAN-ed to the terminals).

In some instances, an additional step includes facilitating the payment device providing the terminal assembly, in connection with the putative transaction, with an indication (e.g., DRDOL) that the payment device is able to recover incomplete transactions. Such indication may further include an indication of what data elements the terminal assembly should include in the transaction recovery data.

As noted, in some instances, the ability to recover incomplete transactions may be activated during a personalization process for the payment device.

During a putative transaction, the card can supply DRDOL to the reader at a number of different times; step 308 is preferred but in other instances, the card can supply DRDOL to the reader in step 304, step 306, or step 302.

A further step can include facilitating the payment device storing on-device recovery data in connection with the putative transaction; this storage is preferably contemporaneous with updating (e.g., decrementing) the on-device balance in response to the first command. As discussed above, if the "tearing" takes place earlier, data for recovery may not be present on the card and an error can be returned; the terminal can then just issue a new Generate AC or similar command. As discussed above, the on-device recovery data may include, for example, at least a cryptogram and a transaction counter.

In an alternative approach, the obtaining, by the payment terminal assembly, of the identifier of the payment device, upon the re-presentation of the payment device to the payment terminal assembly, further includes obtaining, by the payment terminal assembly, the identity of the putative transaction, stored on the payment device. In such an approach, upon the re-presentation of the payment device to the payment terminal assembly, a further step includes comparing, by the payment terminal assembly, of the obtained identity of the putative transaction, stored on the payment device, to corresponding contents of the storage area; the sending of the second command is further conditioned upon the comparison of the obtained identity of the putative transaction, stored on the payment device with the corresponding contents of the storage area which were recorded in storage area when the payment terminal assembly detected that the putative transaction was torn. Note that "comparison" does not necessarily imply a match; indeed, in some instances, the second command may be sent when there is not a match, as in the "reverse" alternative embodiment.

In still another alternative approach, the terminal may simply issue a RECOVER AC or similar command and compare the response to appropriate data stored in connection with torn transactions; if there is no match, the response may be discarded; if there is a match, the torn transaction may be recovered. Thus, the payment device responds to the second command with the re-produced cryptogram; and the payment terminal assembly determines whether the reproduced cryptogram corresponds to the putative transaction, and proceeds accordingly. However, this approach may only be applicable if CDA is always used as without CDA the payment terminal assembly may not be able to reliably perform the determination.

In another aspect, one or more processors of a payment terminal assembly as described above carry out or otherwise facilitate any one, some or all of the method steps described above.

In still another aspect, one or more processors of a payment device as described above carry out or otherwise facilitate any one, some or all of the method steps described above.

In an even further aspect, while the non-limiting examples given thus far have focused on interaction of a physical payment device with a physical payment terminal assembly, one or both of the device and terminal assembly could be virtual. US Patent Publication 2001-0027441 of Wankmueller, entitled "System and method for conducting electronic commerce with a remote wallet server," is expressly incorporated herein by reference in its entirety for all purposes (the skilled artisan will in any event be familiar with same). Such publication discloses a method for conducting a transaction over a computer network (such as the Internet) where a remote wallet server conducts a transaction with a merchant computer in a format substantially compliant with a chip card electronic commerce protocol or specification, regardless of whether or not the payment card of the consumer involved in the transaction is a chip card. In such a case, in the event of communication interruption analogous to "tearing," one or more techniques set forth herein could be employed, with the remote wallet server acting as a virtual payment device and the merchant computer acting as a virtual terminal, for example. In some instances, a computing device of the consumer could also act as a virtual payment device. The virtual device and virtual terminal assembly could communicate in a variety of ways, including over the Internet or various other types of computer networks.

In such a case, method steps could include facilitating initial communication of a virtual payment device to a virtual payment terminal assembly in connection with a putative transaction; sending a first command from the virtual payment terminal assembly to the virtual payment device to compute a cryptogram to complete the putative transaction; detecting that the cryptogram is not received as expected; and, responsive to the detection, storing in a storage area of a memory of the virtual terminal an identifier of the payment device and transaction recovery data associated with the putative transaction. Furthermore, additional steps could include obtaining, by the virtual payment terminal assembly, the identifier of the virtual payment device, upon re-communication of the virtual payment device to the virtual payment terminal assembly; upon the re-communication of the virtual payment device to the virtual payment terminal assembly, comparing, by the virtual payment terminal assembly, of the obtained identifier of the virtual payment device to contents of the storage area; and, conditioned at least upon the comparing yielding a match, sending a second command from the virtual payment terminal assembly to the virtual payment device, the second command instructing the virtual payment device to re-produce the cryptogram to complete the putative transaction.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126, a reader 132, a host, server, and/or processing center 140, 142, 144 (optionally with data warehouse 154) of a merchant, issuer, acquirer, processor, or operator of a network 2008, 138 operating according to a payment system standard (and/or specification), and the like. Firmware might be employed, for example, in connection with payment devices such as cards 102, 112, 1302, or phone 1420.

Figure 7:
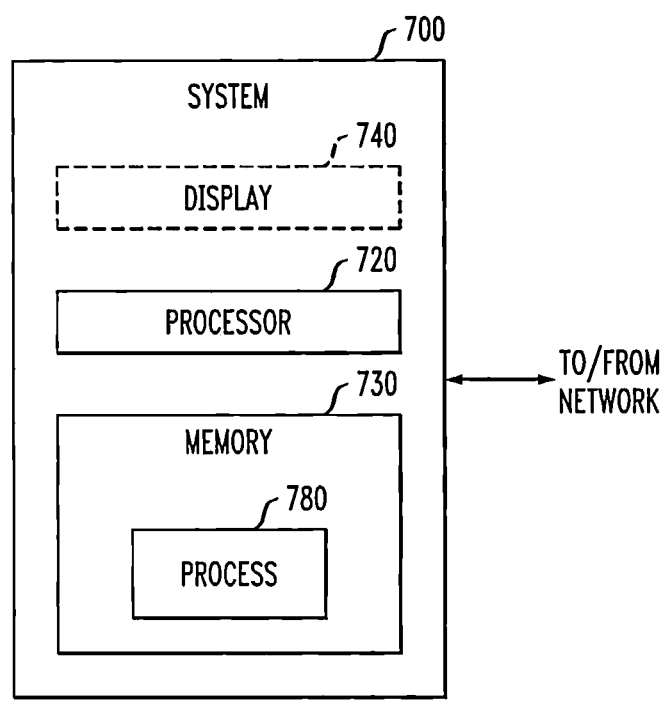
FIG. 7 is a block diagram of an exemplary computer system useful in one or more embodiments of the invention.

FIG. 7 is a block diagram of a system 700 that can implement part or all of one or more aspects or processes of the invention. As shown in FIG. 7, memory 730 configures the processor 720 (which could correspond, e.g., to processor portions 106, 116, 130, 1306, 1460; a processor of a reader 132; processors of remote hosts in centers 140, 142, 144; processors of hosts and/or servers implementing various functionality, and the like) to implement one or more aspects of the methods, steps, and functions disclosed herein (collectively, shown as process 780 in FIG. 7). Different method steps can be performed by different processors. The memory 730 could be distributed or local and the processor 720 could be distributed or singular. The memory 730 could be implemented as an electrical, magnetic or optical memory, or any combination of these or other types of storage devices (including memory portions as described above with respect to cards 102, 112, 1302). It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 122, 124, 126, 140, 142, 144, 130, 132, 2004, 2006, 2008, 2010, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 126, 140, 142, 144, 130, 132, 2004, 2006, 2008, 2010, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" such as server 665 includes a physical data processing system (for example, system 700 as shown in FIG. 7) running a server program. It will be understood that such a physical server may or may not include a display, keyboard, or other input/output components. A "host" includes a physical data processing system (for example, system 700 as shown in FIG. 7) running an appropriate program.

Furthermore, it should be noted that any of the methods described herein can include an additional step of providing a system comprising distinct software modules (in this context, inclusive of firmware as well) embodied on one or more tangible computer readable storage media. All the modules (or any subset thereof) can be on the same medium, or each can be on a different medium, for example. The modules can include any or all of the components shown in the figures. In one or more embodiments, the modules include a payment application module on the card or other payment device and a payment application module on a terminal assembly or the like (optionally, with sub-modules to implement the specific functionality described with respect to FIG. 8). The payment application module on the card can run on one or more hardware processors of the card or other payment device. The payment application module on the terminal assembly can run on one or more hardware processors of the terminal assembly. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 2008, another virtual private network (VPN), the Internet, a local area and/or wide area network (LAN (e.g., LAN 663) and/or WAN), via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:

upon initial presentation of a device to a terminal assembly in connection with a putative data storage transaction, said device comprising a device memory storing a device-side application, and at least one device processor coupled to said device memory, said terminal assembly comprising a terminal memory, storing a terminal-side application, and at least one terminal processor coupled to said terminal memory, said terminal-side application executing on said at least one terminal processor establishing communications with said device-side application executing on said at least one device processor;

sending a first command from said terminal-side application executing on said at least one terminal processor to said device-side application executing on said at least one device processor to instruct said device-side application executing on said at least one device processor to compute a cryptogram to complete said putative data storage transaction;

said terminal-side application executing on said at least one terminal processor detecting that said cryptogram is not received as expected from said device-side application executing on said at least one device processor;

responsive to said detection, said terminal-side application executing on said at least one terminal processor storing in a storage area of said terminal memory an identifier of said device and data storage transaction recovery data associated with said putative data storage transaction;

obtaining, by said terminal-side application executing on said at least one terminal processor, said identifier of said device, upon re-presentation of said device to said terminal assembly;

upon said re-presentation of said device to said terminal assembly, comparing, by said terminal-side application executing on said at least one terminal processor, of said obtained identifier of said device to contents of said storage area; and conditioned at least upon said comparing yielding a match, sending a second command from said terminal-side application executing on said at least one terminal processor to said device-side application executing on said at least one device processor, said second command instructing said device-side application executing on said at least one device processor to re-produce said cryptogram and send it to said terminal-side application executing on said at least one terminal processor to complete said putative data storage transaction.

2. A method comprising the steps of:

upon initial presentation of a payment device to a payment terminal assembly in connection with a putative transaction, said payment device comprising a payment device memory storing a device-side payment application, with an on-device balance, and at least one payment device processor coupled to said payment device memory, said payment terminal assembly comprising a terminal memory, storing a terminal-side payment application, and at least one terminal processor coupled to said terminal memory, said terminal-side payment application executing on said at least one terminal processor establishing communications with said device-side payment application executing on said at least one payment device processor;

sending a first command from said terminal-side payment application executing on said at least one terminal processor to said device-side payment application executing on said at least one payment device processor to instruct said device-side payment application executing on said at least one device processor to compute an original cryptogram to complete said putative transaction;

said terminal-side payment application executing on said at least one terminal processor detecting that said original cryptogram is not received as expected from said device-side payment application executing on said at least one payment device processor;

responsive to said detection, said terminal-side payment application executing on said at least one terminal processor storing in a storage area of said terminal memory an identifier of said payment device and transaction recovery data associated with said putative transaction;

obtaining, by said terminal-side payment application executing on said at least one terminal processor, said identifier of said payment device, upon re-presentation of said payment device to said payment terminal assembly;

upon said re-presentation of said payment device to said payment terminal assembly, comparing, by said terminal-side payment application executing on said at least one terminal processor, of said obtained identifier of said payment device to contents of said storage area; and conditioned at least upon said comparing yielding a match, sending a second command from said terminal-side payment application executing on said at least one terminal processor to said device-side payment application executing on said at least one payment device processor, said second command instructing said device-side payment application executing on said at least one payment device processor to re-produce said original cryptogram as a re-produced cryptogram and send it to said terminal-side application executing on said at least one terminal processor to complete said putative transaction, wherein said re-produced cryptogram has a different value but same meaning as compared to said original cryptogram.

3. A method comprising the steps of:

upon initial communication of a real payment device to a virtual payment terminal assembly in connection with a putative transaction, said real payment device comprising a payment device memory storing a device-side payment application, with an on-device balance, and at least one payment device processor coupled to said payment device memory, said virtual payment terminal assembly comprising a virtual payment terminal memory, storing a virtual payment terminal-side payment application, and at least one virtual payment terminal processor coupled to said virtual payment terminal memory, said virtual payment terminal-side payment application executing on said at least one virtual payment terminal processor establishing communications with said device-side payment application executing on said at least one payment device processor;

sending a first command from said virtual payment terminal-side payment application executing on said at least one virtual payment terminal processor to said device-side payment application executing on said at least one payment device processor to instruct said device-side payment application executing on said at least one device processor to compute a cryptogram to complete said putative transaction;

said virtual payment terminal-side payment application executing on said at least one virtual payment terminal processor detecting that said cryptogram is not received as expected from said device-side payment application executing on said at least one payment device processor;

responsive to said detection, said virtual payment terminal-side payment application executing on said at least one processor storing in a storage area of said memory of said virtual terminal an identifier of said real payment device and transaction recovery data associated with said putative transaction;

obtaining, by said virtual payment terminal-side payment application executing on said at least one virtual payment terminal processor, said identifier of said real payment device, upon re-communication of said real payment device to said virtual payment terminal assembly;

upon said re-communication of said real payment device to said virtual payment terminal assembly, comparing, by said virtual payment terminal-side payment application executing on said at least one virtual payment terminal processor, of said obtained identifier of said real payment device to contents of said storage area; and conditioned at least upon said comparing yielding a match, sending a second command from said virtual payment terminal-side payment application executing on said at least one virtual payment terminal processor to said device-side payment application executing on said at least one payment device processor, said second command instructing said device-side payment application executing on said at least one payment device processor to re-produce said cryptogram and send it to said virtual payment terminal terminal-side payment application executing on said at least one virtual payment terminal processor to complete said putative transaction.

4. A method comprising the steps of:

upon initial communication of a virtual payment device to a real payment terminal assembly in connection with a putative transaction, said virtual payment device comprising a virtual payment device memory storing a device-side virtual payment application, and at least one virtual payment device processor coupled to said virtual payment device memory, said real payment terminal assembly comprising a terminal memory, storing a terminal-side payment application, and at least one terminal processor coupled to said terminal memory, said terminal-side payment application executing on said at least one terminal processor establishing communications with said virtual payment device-side payment application executing on said at least one virtual payment device processor;

sending a first command from said terminal-side payment application executing on said at least one terminal processor to said virtual payment device-side payment application executing on said at least one virtual payment device processor to instruct said virtual payment device-side payment application executing on said at least one virtual payment device processor to compute a cryptogram to complete said putative transaction;

said terminal-side payment application executing on said at least one terminal processor detecting that said cryptogram is not received as expected from said virtual payment device-side payment application executing on said at least one virtual payment device processor;

responsive to said detection, said terminal-side payment application executing on said at least one terminal processor storing in a storage area of said memory of said real terminal an identifier of said virtual payment device and transaction recovery data associated with said putative transaction;

obtaining, by said terminal-side payment application executing on said at least one terminal processor, said identifier of said virtual payment device, upon re-communication of said virtual payment device to said real payment terminal assembly;

upon said re-communication of said virtual payment device to said real payment terminal assembly, comparing, by said terminal-side payment application executing on said at least one terminal processor, of said obtained identifier of said virtual payment device to contents of said storage area; and conditioned at least upon said comparing yielding a match, sending a second command from said terminal-side payment application executing on said at least one terminal processor to said virtual payment device-side payment application executing on said at least one virtual payment device processor, said second command instructing said virtual payment device-side payment application executing on said at least one virtual payment device processor to re-produce said cryptogram and send it to said terminal-side payment application executing on said at least one terminal processor to complete said putative transaction.

5. The method of claim 1, further comprising sending at least pertinent portions of said data storage transaction recovery data from said terminal-side application executing on said at least one terminal processor to said device-side application executing on said at least one device processor, wherein, in said storing step, said transaction recovery data comprises at least one of:
a terminal unpredictable number associated with said putative transaction; and
a date and time of said putative transaction.

6. The method of claim 1, further comprising:
sending at least pertinent portions of said data storage transaction recovery data from said terminal-side application executing on said at least one terminal processor to said device-side application executing on said at least one device processor; and said terminal-side application executing on said at least one terminal processor obtaining from said device-side application executing on said at least one device processor in connection with said putative transaction, an indication that said device is able to recover incomplete transactions.

7. The method of claim 1, wherein said obtaining, by said terminal-side application executing on said at least one terminal processor, of said identifier of said device, upon said re-presentation of said device to said terminal assembly, further comprises obtaining, by said terminal-side application executing on said at least one terminal processor, of an identity of said putative transaction, stored on said device, further comprising: upon said re-presentation of said device to said terminal assembly, comparing, by said terminal-side application executing on said at least one terminal processor, of said obtained identity of said putative transaction, stored on said device, to corresponding contents of said storage area; wherein said sending of said second command is further conditioned upon said comparison of said obtained identity of said putative transaction, stored on said device, to said corresponding contents of said storage area.

8. The method of claim 2, further comprising sending at least pertinent portions of transaction recovery data from said terminal-side payment application executing on said at least one payment terminal processor to said device-side payment application executing on said at least one payment device processor, wherein, in said storing step, said transaction recovery data comprises at least one of:
a terminal unpredictable number associated with said putative transaction; and
a date and time of said putative transaction.

9. The method of claim 2, further comprising:
sending at least pertinent portions of said transaction recovery data from said terminal-side payment application executing on said at least one payment terminal processor to said device-side payment application executing on said at least one payment device processor; and said terminal-side payment application executing on said at least one payment terminal processor obtaining from said device-side payment application executing on said at least one payment device processor in connection with said putative transaction, an indication that said payment device is able to recover incomplete transactions.

10. The method of claim 2, wherein said obtaining, by said terminal-side payment application executing on said at least one payment terminal processor, of said identifier of said payment device, upon said re-presentation of said payment device to said payment terminal assembly, further comprises obtaining, by said terminal-side payment application executing on said at least one payment terminal processor, of an identity of said putative transaction, stored on said payment device, further comprising: upon said re-presentation of said payment device to said payment terminal assembly, comparing, by said terminal-side payment application executing on said at least one payment terminal processor, of said obtained identity of said putative transaction, stored on said payment device, to corresponding contents of said storage area; wherein said sending of said second command is further conditioned upon said comparison of said obtained identity of said putative transaction, stored on said payment device, to said corresponding contents of said storage area.

11. The method of claim 3, further comprising sending at least pertinent portions of said data storage transaction recovery data from said virtual terminal-side payment application executing on said at least one virtual terminal processor to said device-side payment application executing on said at least one payment device processor, wherein, in said storing step, said transaction recovery data comprises at least one of:
- a terminal unpredictable number associated with said putative transaction; and
- a date and time of said putative transaction.

12. The method of claim 3, further comprising:
- sending at least pertinent portions of said transaction recovery data from said virtual terminal-side payment application executing on said at least one virtual terminal processor to said device-side payment application executing on said at least one payment device processor; and
- said virtual terminal-side payment application executing on said at least one virtual terminal processor obtaining from said device-side payment application executing on said at least one payment device processor in connection with said putative transaction, an indication that said payment device is able to recover incomplete transactions.

13. The method of claim 3, wherein said obtaining, by said virtual terminal-side payment application executing on said at least one virtual terminal processor, of said identifier of said payment device, upon said re-presentation of said payment device to said virtual terminal assembly, further comprises obtaining, by said virtual terminal-side payment application executing on said at least one virtual terminal processor, of an identity of said putative transaction, stored on said payment device, further comprising: upon said re-presentation of said payment device to said virtual terminal assembly, comparing, by said virtual terminal-side payment application executing on said at least one virtual terminal processor, of said obtained identity of said putative transaction, stored on said payment device, to corresponding contents of said storage area; wherein said sending of said second command is further conditioned upon said comparison of said obtained identity of said putative transaction, stored on said payment device, to said corresponding contents of said storage area.

14. The method of claim 4, further comprising sending at least pertinent portions of said transaction recovery data from said terminal-side payment application executing on said at least one payment terminal processor to said device-side virtual payment application executing on said at least one virtual payment device processor, wherein, in said storing step, said transaction recovery data comprises at least one of:
- a terminal unpredictable number associated with said putative transaction; and
- a date and time of said putative transaction.

15. The method of claim 4, further comprising:
- sending at least pertinent portions of said transaction recovery data from said terminal-side payment application executing on said at least one payment terminal processor to said device-side virtual payment application executing on said at least one virtual payment device processor; and
- said terminal-side payment application executing on said at least one payment terminal processor obtaining from said device-side virtual payment application executing on said at least one virtual payment device processor in connection with said putative transaction, an indication that said virtual payment device is able to recover incomplete transactions.

16. The method of claim 4, wherein said obtaining, by said terminal-side payment application executing on said at least one payment terminal processor, of said identifier of said virtual payment device, upon said re-presentation of said virtual payment device to said payment terminal assembly, further comprises obtaining, by said terminal-side payment application executing on said at least one payment terminal processor, of an identity of said putative transaction, stored on said virtual payment device, further comprising: upon said re-presentation of said virtual payment device to said payment terminal assembly, comparing, by said terminal-side payment application executing on said at least one payment terminal processor, of said obtained identity of said putative transaction, stored on said virtual payment device, to corresponding contents of said storage area; wherein said sending of said second command is further conditioned upon said comparison of said obtained identity of said putative transaction, stored on said virtual payment device, to said corresponding contents of said storage area.

* * * * *